United States Patent
Kusada et al.

(10) Patent No.: US 8,437,235 B2
(45) Date of Patent: May 7, 2013

(54) OPTICAL INFORMATION RECORDING MEDIUM AND RECORDING/REPRODUCING METHOD THEREFOR

(75) Inventors: Hideo Kusada, Osaka (JP); Rie Kojima, Osaka (JP); Takashi Nishihara, Osaka (JP); Akio Tsuchino, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 12/918,710

(22) PCT Filed: Dec. 16, 2009

(86) PCT No.: PCT/JP2009/006936
§ 371 (c)(1),
(2), (4) Date: Nov. 12, 2010

(87) PCT Pub. No.: WO2010/070901
PCT Pub. Date: Jun. 24, 2010

(65) Prior Publication Data
US 2011/0058463 A1    Mar. 10, 2011

(30) Foreign Application Priority Data
Dec. 16, 2008    (JP) .................. 2008-319229

(51) Int. Cl.
*G11B 7/00*    (2006.01)
(52) U.S. Cl.
USPC ..... 369/94; 369/53.2; 369/275.1; 430/270.13
(58) Field of Classification Search .................... 369/94, 369/283, 53.1, 53.11, 53.2, 275.1; 430/269, 430/270.1, 270.11, 270.12, 270.13
See application file for complete search history.

(56) References Cited

U.S. PATENT DOCUMENTS

| 5,234,737 A | * | 8/1993 | Ueno et al. ................ 428/64.4 |
| 5,688,574 A | * | 11/1997 | Tamura et al. ............... 428/64.1 |

(Continued)

FOREIGN PATENT DOCUMENTS

| JP | 64-32438 | 2/1989 |
| JP | 7-266706 | 10/1995 |

(Continued)

*Primary Examiner* — Thomas Alunkal
(74) *Attorney, Agent, or Firm* — Hamre, Schumann, Mueller & Larson, P.C.

(57) ABSTRACT

An optical information recording medium (100) of the present invention includes an information layer (011) that allows information to be recorded thereon and reproduced therefrom by irradiation with a laser beam (040). The information layer (011) includes a reflective layer (002), a first dielectric layer (003), a recording layer (005) capable of undergoing a phase change by the irradiation with the laser beam (040) and a second dielectric layer (007) formed in this order from a side opposite to a laser beam incident side. The recording layer (005) contains Ge, Sb and Te. When Ge, Sb and Te contained in the recording layer (005) are represented by $Ge_xSb_yTe_z$ in atomic number ratio, x, y, and z satisfy $0.39 \leq x \leq 0.48$, $0.02 \leq y < 0.11$, $0.40 \leq z < 0.56$, and $x+y+z=1$. The recording layer (005) has a thickness of at least 10 nm but not more than 15 nm. In the case where a ratio of an amount of reflected light of the laser beam (040) from the information layer (011) to an amount of the laser beam (040) incident on the information layer (011) is denoted as R (%), the R when the recording layer (005) is in a crystalline state is denoted as Rc (%), and the R when the recording layer (005) is in an amorphous state is denoted as Ra (%), Rc and Ra satisfy $6.0 \leq Rc/Ra \leq 12.0$ and $1.0 \leq Rc \leq 3.0$.

23 Claims, 1 Drawing Sheet

U.S. PATENT DOCUMENTS

| | | | |
|---|---|---|---|
| 5,753,413 A * | 5/1998 | Nishida et al. | 430/270.13 |
| 5,882,759 A * | 3/1999 | Hirotsune et al. | 428/64.1 |
| 6,143,468 A | 11/2000 | Ohno et al. | |
| 6,268,034 B1 * | 7/2001 | Kitaura et al. | 428/64.1 |
| 6,670,014 B2 | 12/2003 | Nishihara et al. | |
| 7,580,340 B2 | 8/2009 | Shingai et al. | |
| 2001/0016242 A1 * | 8/2001 | Miyamoto et al. | 428/64.4 |
| 2002/0018869 A1 * | 2/2002 | Abiko et al. | 428/64.4 |
| 2003/0152867 A1 * | 8/2003 | Ichihara et al. | 430/270.13 |
| 2004/0027965 A1 * | 2/2004 | Kurodawa | 369/94 |
| 2005/0074694 A1 * | 4/2005 | Nishihara et al. | 430/270.13 |
| 2007/0248785 A1 | 10/2007 | Nakai et al. | |
| 2008/0239934 A1 * | 10/2008 | Shingai et al. | 369/275.1 |
| 2009/0286037 A1 | 11/2009 | Tsuchino et al. | |

FOREIGN PATENT DOCUMENTS

| | | |
|---|---|---|
| JP | 10-112028 | 4/1998 |
| JP | 2003-196892 | 7/2003 |
| JP | 3801612 | 5/2006 |
| JP | 2006-155794 | 6/2006 |
| JP | 2007-293949 | 11/2007 |
| JP | 2008-135157 | 6/2008 |

\* cited by examiner

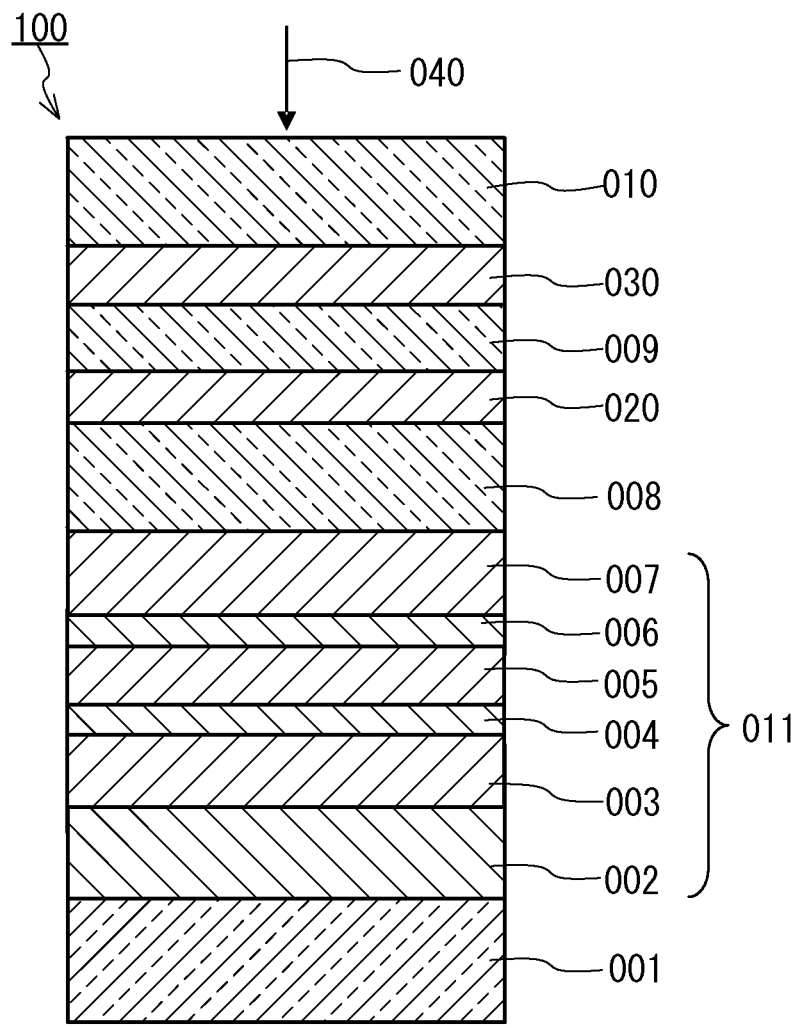

OPTICAL INFORMATION RECORDING MEDIUM AND RECORDING/REPRODUCING METHOD THEREFOR

TECHNICAL FIELD

The present invention relates to an information recording medium that allows information to be recorded and/or reproduced thereon and/or therefrom by irradiation with a laser beam, and a method for recording and/or reproducing information on and/or from the information recording medium.

BACKGROUND ART

There have been widely researched, developed, and commercialized information recording media that allow signals to be recorded thereon and erased therefrom by irradiating a thin film formed of, for example, a chalcogen material with a laser beam to heat it locally and causing a phase change between states with different optical constants due to the difference in irradiation conditions.

Generally, information is recorded by irradiating a recording layer with a high power (recording power) laser beam so as to melt the recording layer, and cooling it rapidly to turn the irradiated portion to an amorphous phase. In contrast, when erasing information, the recording layer is irradiated with a laser beam at a lower power (erasing power) than that used for recording so as to increase the temperature of the recording layer, and cooling it gradually to turn the irradiated portion to a crystalline phase. Thus, the information recorded before is erased. Hence, it is possible to record new information (rewrite) on phase-change optical information recording media while erasing the recorded information therefrom by allowing its recording layer to be irradiated with a laser beam at a power modulated between a high power level and a low power level.

More specifically, the phase-change information recording media allow information to be recorded thereon and reproduced therefrom by utilizing the phenomenon that the amounts of reflected light are different between the crystalline state and the amorphous state when using light with a specified wavelength. Thus, erasure and recording of information are performed at the same time by modulating the output power of the laser beam.

In recent years, various techniques have been studied for increasing the capacities of optical recording media. For example, there has been studied a technique for performing high-density recording, in which the spot diameter of the laser beam is reduced by using a blue-violet laser that has a shorter wavelength than that of a conventional red laser, and/or reducing the thickness of a substrate on a laser beam incident side and using an objective lens with a high numerical aperture (NA).

There already has been commercialized an information recording medium (see Patent Literature 1) including two information layers, in which information is recorded on and reproduced from the two information layers by using a laser beam that is incident from one side of the information recording medium.

For example, there has been commercialized a 120 mm-diameter BD-RE medium that allows information to be recorded thereon and reproduced therefrom using a laser beam at a wavelength of 405 nm, and has a recording capacity of 50 GB per one side (in total of two information layers).

In an optical information recording medium including two information layers on and from which information can be recorded and reproduced, recording and reproducing information on and from the information layer (a first information layer) disposed farther from the laser beam incident side are performed with a laser beam that has passed through the other information layer (a second information layer) located closer to the laser beam incident side.

CITATION LIST

Patent Literature
PTL 1: JP 3801612 B

SUMMARY OF INVENTION

Technical Problem

The present inventors studied on an optical information recording medium with a higher capacity than that of the existing product (the optical information recording medium including two information layers) described in BACKGROUND ART, that is, a 120 mm-diameter optical information recording medium with a recording capacity higher than 50 GB per one side.

More specifically, the present inventors studied on an optical information recording medium including three or more of the information layers, which has been increased from the conventional number of two, and having a recording capacity of 33.4 GB per information layer, which has been increased from the conventional capacity of 25 GB.

As a result, the following problems were found with the first information layer.

1) As the number of the information layers included in the optical information recording medium increases, the amount of attenuation of the laser beam increases when information is reproduced from the first information layer, making it difficult to ensure a sufficient amount of light for the reproduction.

2) Increasing the recording density reduces the interval between a recorded region and an unrecorded region. When reproduction is performed using a laser focus spot of a size almost equal to that of a recorded region, the probability of the recorded region and unrecorded region being present within the laser spot is increased. This makes it difficult to distinguish between the signals.

3) As the number of the information layers included in the optical information recording medium increases, the straightness and directivity of the laser beam are more likely to be disturbed by track grooves formed in the information layers other than the first information layer. This makes it difficult further to distinguish the recorded region from the unrecorded region.

As one of the methods for solving the problem 1, it is effective to increase the ratio of the amount of reflected light from the first information layer to the amount of light incident on the first information layer (reflectance) to be equal to or higher than the reflectance of the first information layer used for the conventional optical information recording medium including two information layers. The reflectance mentioned here indicates a reflectance (hereinafter referred to as Rc) when the recording layer is in the crystalline state (unrecorded state).

By increasing Rc, it is possible to increase the amount of laser beam for reproducing information from the first information layer. It is rather desirable that a reflectance (hereinafter referred to as Ra) when the recording layer is in the amorphous state (recorded state) be lowered in order to realize the high contrast as described below.

As one of the methods for solving the problem 2, it is effective to increase a difference between Rc and Ra (to achieve clearer contrast) and lower Ra (to suppress the noise).

More specifically, it is effective to increase (Rc−Ra)/Ra, and it is desirable to increase Rc/Ra. Achieving the high contrast can alleviate the problem 3 that makes it difficult further to distinguish the recorded region from the unrecorded region.

However, it is not easy to increase Rc and Rc/Ra at the same time while achieving satisfactory rewriting performance in consideration of the rewriting performance of the information layer.

From the viewpoint of the material of the recording layer, the rewriting performance of the information layer is determined mainly by the temperature and time at which the recording layer material changes from the amorphous state to the crystalline state, the temperature and time at which the recording layer material changes from the crystalline state to the amorphous state, and the heat conductivity of the recording material. From the viewpoint of the materials composing the layers other than the recording layer, the rewriting performance of the information layer is determined mainly by the heat conductivities, the adhesion to an adjacent layer, and the heat resistances of these materials.

It is not easy to achieve sufficiently the satisfactory properties of the films composing the information layer and the satisfactory optical properties at the same time.

The present invention is intended to provide an optical information recording medium that has satisfactory recording and reproducing properties, satisfactory archival characteristics and rewriting performance, and can be increased in capacity.

Solution to Problem

A first optical information recording medium of the present invention includes an information layer that allows information to be recorded thereon and reproduced therefrom by irradiation with a laser beam. The information layer includes at least a reflective layer, a first dielectric layer, a recording layer capable of undergoing a phase change by the irradiation with the laser beam and a second dielectric layer formed in this order from a side opposite to a laser beam incident side. The recording layer contains Ge, Sb and Te, and when Ge, Sb and Te contained in the recording layer are represented by $Ge_xSb_yTe_z$ in atomic number ratio, x, y, and z satisfy $0.39 \leq x < 0.48$, $0.02 \leq y < 0.11$, $0.40 \leq z < 0.56$, and $x+y+z=1$. The recording layer has a thickness of at least 10 nm but not more than 15 nm. In the case where a ratio of an amount of reflected light of the laser beam from the information layer to an amount of the laser beam incident on the information layer is denoted as R (%), the R when the recording layer is in a crystalline state is denoted as Rc (%), and the R when the recording layer is in an amorphous state is denoted as Ra (%), Rc and Ra satisfy $6.0 \leq Rc/Ra \leq 12.0$ and $1.0 \leq Rc \leq 3.0$.

A second optical information recording medium of the present invention includes an information layer that allows information to be recorded thereon and reproduced therefrom by irradiation with a laser beam. The information layer includes at least a reflective layer, a first dielectric layer, a recording layer capable of undergoing a phase change by the irradiation with the laser beam and a second dielectric layer formed in this order from a side opposite to a laser beam incident side. The recording layer contains Ge, Sb and Te, and when Ge, Sb and Te contained in the recording layer are represented by $Ge_xSb_yTe_z$ in atomic number ratio, x, y, and z satisfy $0.05 \leq x \leq 0.15$, $0.70 \leq y \leq 0.80$, $0.05 \leq z \leq 0.25$, and $x+y+z=1$. The recording layer has a thickness of at least 7.0 nm but not more than 12.0 nm. The second dielectric layer has a refractive index of at least 1.8 but not more than 2.4 and a thickness of at least 35 nm but not more than 55 nm. In the case where a ratio of an amount of reflected light of the laser beam from the information layer to an amount of the laser beam incident on the information layer is denoted as R (%), the R when the recording layer is in a crystalline state is denoted as Rc (%), and the R when the recording layer is in an amorphous state is denoted as Ra (%), Rc and Ra satisfy $4.0 \leq Rc/Ra \leq 5.0$ and $1.0 \leq Rc \leq 3.0$.

The method for recording and reproducing information on and from the optical information recording medium of the present invention is a method for recording and reproducing information on and from the first optical information recording medium or the second optical information recording medium. The method includes the step of recording and reproducing information on and from the information layer included in the optical information recording medium at a linear velocity of at least 6.9 m/s but not more than 8.8 m/s.

Advantageous Effects of Invention

The present invention can provide a high-capacity optical information recording medium with excellent recording and reproducing properties, recording and reproducing life (archival characteristics), and rewriting performance. Furthermore, the recording and reproducing method of the present invention makes it possible to record and reproduce information on and from such an optical information recording medium in a satisfactory manner.

BRIEF DESCRIPTION OF DRAWING

FIG. 1 is a partial cross-sectional view of an optical information recording medium according to an embodiment of the present invention.

DESCRIPTION OF EMBODIMENTS

Hereinafter, embodiments of the present invention will be described with reference to the drawings. The following embodiments are examples of the present invention and the present invention is not limited to these.

FIG. 1 shows a partial cross-sectional view of an optical information recording medium 100 according to the present embodiment. Information is recorded on and reproduced from the optical information recording medium 100 by irradiation with a laser beam 040. The optical information recording medium 100 of the present embodiment is the optical information recording medium of the present invention including three information layers. More specifically, the optical information recording medium 100 is the optical information recording medium of the present invention including a first information layer to an N-th information layer, where N=3, formed sequentially from a side opposite to a laser beam incident side.

The optical information recording medium 100 includes a substrate 001, a first optical separation layer 008, a first information layer 011 and a second information layer 020 disposed so as to sandwich the optical separation layer 008 therebetween, a second optical separation layer 009, a third information layer 030 disposed so as to sandwich the optical separation layer 009 between the second information layer 020 and itself, and a cover layer 010.

The second information layer 020 is disposed closer to the laser beam 040 incident side than the first information layer 011. The third information layer 030 is disposed closer to the laser beam 040 incident side than the second information layer 020.

The first information layer 011 includes a reflective layer 002, a first dielectric layer 003, a first interface layer 004, a recording layer 005, a second interface layer 006 and a second dielectric layer 007 disposed sequentially from a side opposite to the laser beam 040 incident side.

Although not shown in the FIGURE, the third information layer 030 and the second information layer 020 each include, for example, a transmittance adjusting layer, a reflective layer, a first dielectric layer, a recording layer, an interface layer and a second dielectric layer disposed sequentially from the side opposite to the laser beam 040 incident side.

The film structure of the third information layer 030 is designed assuming that the third information layer 030 has a transmittance of approximately, for example, 50% with respect to the laser beam 040. Likewise, the film structure of the second information layer 020 is designed assuming that the second information layer 020 has a transmittance of approximately, for example, 50% with respect to the laser beam 040.

The laser beam 040 is incident from a cover layer 010 side. The laser beam 040 that has transmitted through the third information layer 030, the second optical separation layer 009, the second information layer 020, and the first optical separation layer 008 is used to record and reproduce information on and from the first information layer 011.

When the intensity of the laser beam 040 is referred to as I (mW), the intensity of the laser beam used for recording and reproducing information on and from the first information layer 011 is represented by 0.25×I (mW).

In contrast, when the reflectance of the first information layer 011 is referred to as R', the intensity of the laser beam that is reflected by the first information layer 011 and returned through the first optical separation layer 008, the second information layer 020, the second optical separation layer 009, and the third information layer 030 is represented by 0.0625×I×R' (mW), attenuating to approximately 1/16 of the intensity of the incident laser beam.

The substrate 001 can be formed using, for example, glass or a resin such as polycarbonate, amorphous polyolefin, and PMMA (polymethylmethacrylate).

A guide groove for guiding the laser beam 040 may be formed in an inner surface of the substrate 001 (on a first optical separation layer 008 side), if needed. An outer surface of the substrate 001 preferably is smooth. Preferably, the substrate 001 has low optical birefringence in a short wavelength region. As the material for the substrate 001, polycarbonate particularly is useful because it is inexpensive and has excellent transfer property and mass productivity. The substrate 001 has a thickness in the range of, for example, 800 µm to 1300 µm (preferably 1050 µm to 1150 µm).

As the material for the reflective layer 002, there can be used a single metal with a high thermal conductivity, such as Al, Au, Ag, and Cu. Or it is possible to use an alloy containing: one or a plurality of metal elements selected from these metal elements as its main component; and one or a plurality of other elements added thereinto in order to, for example, enhance the moisture resistance or adjust the thermal conductivity. Specifically, it is possible to use an alloy such as Al—Cr, Al—Ti, Au—Pd, Au—Cr, Ag—Pd, Ag—Pd—Cu, Ag—Pd—Ti, Ag—Ru—Au, and Cu—Si. All of these alloys are excellent materials having excellent corrosion resistance and satisfying rapid cooling requirements. Particularly, materials (Ag or Ag alloys) containing Ag as a main component are preferable as the material for the reflective layer 002 because they have a high heat conductivity as well as a high light transmittance. Here, a material containing Ag as a main component means a material containing 90 wt % or more of Ag. For example, a material containing 95 wt % or more of Ag and further containing at least one element selected from In, Pd, Cu, Bi, Ga, and Nd is used preferably because it can ensure a high heat conductivity and excellent corrosion resistance.

Preferably, the reflective layer 002 has a thickness in the range of 30 nm to 150 nm, and more preferably, in the range of 70 nm to 120 nm. The reflective layer 002 with a thickness of less than 30 nm has an insufficient thermal diffusion function, making it difficult for the recording layer 005 to be amorphous in some cases. In contrast, the reflective layer 002 with a thickness of more than 150 nm has an excess thermal diffusion function, lowering the recording sensitivity of the first information layer 011 in some cases. For example, when the reflective layer 002 is formed of a material containing Ag as a main component, the reflective layer 002 has a thickness preferably in the range of 60 nm to 200 nm.

The reflective layer 002 can be formed by sputtering, for example.

The first dielectric layer 003 and the second dielectric layer 007 each are composed of dielectric material. These dielectric layers have a function of adjusting an optical distance so as to enhance the optical absorption efficiency of the recording layer 005, and a function of increasing the difference in the amount of reflected light between before and after recording so as to increase the signal amplitude. For these dielectric layers, it is possible to use, for example, oxides such as $SiO_x$, where x is 0.5 to 2.5, $Al_2O_3$, $TiO_2$, $Ta_2O_5$, $ZrO_2$, $ZnO$, $Cr_2O_3$, $Ta_2O_5$, $Bi_2O_3$, $Bi_4T_3O_{12}$, $CeO_2$, $Cu_2O$, $In_2O_3$, $MgO$, $MgSiO_3$, $Nb_2O_5$, $SnO_2$, $WO_3$, $Y_2O_3$, $ZrSiO_4$, and Te—O. Also, nitrides such as Si—N, Al—N, Ti—N, Ta—N, Zr—N, and Ge—N can be used. Furthermore, sulfides such as ZnS, and carbides such as SiC can be used. In addition, a mixture of the above-mentioned materials also can be used.

The thicknesses of the first dielectric layer 003 and the second dielectric layer 007 can be determined so as to increase the difference in the amount of reflected light between when the recording layer 005 is in the crystalline phase and when the recording layer 005 is in the amorphous phase and enhance the optical absorption efficiency of the recording layer 005. Specifically, these thicknesses can be determined by, for example, a calculation according to a matrix method.

Preferable thicknesses, etc. of the first dielectric layer 003 and the second dielectric layer 007 in the case where the recording layer 005 is as in the after-mentioned Embodiment 1 will be described, for example.

The thicknesses of the first dielectric layer 003 and the second dielectric layer 007 are adjusted so that in the case where a ratio of an amount of reflected light of the laser beam 040 from the information layer 011 to an amount of the laser beam 040 incident on the information layer 011 is denoted as R (%), the R when the recording layer is in a crystalline state is denoted as Rc (%), and the R when the recording layer is in an amorphous state is denoted as Ra (%), Rc and Ra satisfy $6.0 \leq Rc/Ra \leq 12.0$ and $1.0 \leq Rc \leq 3.0$.

It is preferable, for example, that the first dielectric layer 003 has a refractive index of at least 2.5 but not more than 2.8 and a thickness of at least 9 nm but not more than 20 nm. The first dielectric layer 003 with the properties can be formed of, for example, an oxide material containing Ti, an oxide material containing Bi and Ti, or an oxide material containing Nb and Ti.

It is preferable, for example, that the second dielectric layer 007 has a refractive index of at least 1.8 but not more than 2.4 and a thickness of at least 45 nm but not more than 65 nm. The second dielectric layer 007 with the properties can be formed of, for example, a material containing a sulfide of Zn and an oxide of Si.

Likewise, preferable thicknesses, etc. of the first dielectric layer 003 and the second dielectric layer 007 in the case where the recording layer 005 is as in the after-mentioned Embodiment 2 will be described as well.

In this case, the thicknesses of the first dielectric layer 003 and the second dielectric layer 007 are adjusted so that Rc and Ra satisfy $4.0 \leq Rc/Ra \leq 5.0$ and $1.0 \leq Rc \leq 3.0$.

It is preferable, for example, that the first dielectric layer 003 has a refractive index of at least 1.4 but less than 2.3 and a thickness of at least 10 nm but not more than 20 nm. The first dielectric layer 003 with the properties can be formed of an oxide material containing Zr and Cr.

The second dielectric layer 007 has a refractive index of at least 1.8 but not more than 2.4 and a thickness of at least 35 nm but not more than 55 nm. The second dielectric layer 007 can be formed of, for example, a material containing a sulfide of Zn and an oxide of Si.

The first interface layer 004 and the second interface layer 006 have functions of preventing the mass transfer between the first dielectric layer 003 and the recording layer 005 and between the second dielectric layer 007 and the recording layer 005, respectively. These interface layers prevent particularly the mass transfer caused by repetitive recordings. For these interface layers, it is possible to use, for example, oxides such as $SiO_x$, where x is 0.5 to 2.5, $Al_2O_3$, $TiO_2$, $Ta_2O_5$, $ZrO_2$, ZnO, $Cr_2O_3$, $Ta_2O_3$, $Bi_2O_3$, $Bi_4T_3O_{12}$, $CeO_2$, $Cu_2O$, $In_2O_3$, MgO, $MgSiO_3$, $Nb_2O_5$, $SnO_2$, $WO_3$, $Y_2O_3$, $ZrSiO_4$, and Te—O. It also is possible to use nitrides such as Si—N, Al—N, Ti—N, Ta—N, Zr—N, and Ge—N, and oxynitrides containing these. Furthermore, carbides such as SiC also can be used. In addition, a mixture of these materials also can be used.

When the interface layers are too thick, the reflectance and absorption coefficient of the information layer change significantly, affecting the recording and erasing performances. Thus, it is desirable that the interface layers have a thickness in the range of 1 nm to 10 nm, and more preferably in the range of 2 nm to 5 nm.

The first interface layer 004 and the second interface layer 006 may be formed of different materials and compositions from each other, or may be formed of the same material and composition as each other. These interface layers can be formed by sputtering, for example.

For example, when the recording layer 005 is formed as in the after-mentioned Embodiment 1 or Embodiment 2, the first interface layer 004 and the second interface layer 006 each have a refractive index of at least 1.8 but less than 2.5 and a thickness of at least 2 nm but not more than 10 nm. The first interface layer 004 and the second interface layer 006 can be formed of, for example, an oxide material containing Zr and Cr.

The recording layer 005 is formed of a material that undergoes a reversible phase change between the crystalline phase and the amorphous phase by the irradiation with the laser beam 040. The recording layer 005 contains Ge, Sb, and Te. The recording layer 005 may contain a component (such as Se, Bi, Ga, C, Si, Zr, Zn, Cr, Al, Cu, and Fe) other than Ge, Sb, and Te. Preferably, however, the recording layer 005 contains Ge, Sb, and Te as its main component. Alternatively, the recording layer 005 may consist essentially of Ge, Sb, and Te. Here, the phrase "the recording layer 005 contains Ge, Sb, and Te as its main component" means that the total of Ge, Sb, and Te atoms is at least 95 atom %, and preferably at least 98 atom %, when the total of all atoms contained in the recording layer 005 is taken as 100 atom %. Even when the recording layer 005 consists essentially of Ge, Sb, and Te, the recording layer 005 may contain a trace amount (0.3 atom % or less, for example) of an element (such as C, Si, Zr, Zn, Cr, Al, Cu, and Fe) other than these elements.

As one embodiment of the recording layer 005, there can be mentioned an embodiment (hereinafter referred to as Embodiment 1) in which: the recording layer 005 contains a GeTe compound and a $Sb_2Te_3$ compound; or the recording layer 005 contains a GeTe compound, an $Sb_2Te_3$ compound, and Sb, and when Ge, Sb, and Te contained in the recording layer 005 are represented by $Ge_xSb_yTe_z$ in atomic number ratio, x, y, and z satisfy $0.39 \leq x \leq 0.48$, $0.02 \leq y < 0.11$, $0.40 \leq z < 0.56$, and $x+y+z=1$.

More specifically, the above-mentioned composition preferably is a composition in which a molar ratio of the GeTe compound to the $Sb_2Te_3$ compound, that is, the value of $(GeTe)/(Sb_2Te_3)$ is at least 9 but not more than 59. Alternatively, the above-mentioned composition preferably may be a composition obtained by adding further Sb into the composition in which the value of $(GeTe)/(Sb_2Te_3)$ is at least 9 but not more than 59.

When the composition containing a GeTe compound, an $Sb_2Te_3$ compound, and Sb is used, it is preferable that the amount of Sb contained in the recording layer 005 is at least 2 atom % but less than 11 atom %.

When the recording material of Embodiment 1 is used, the thickness of the recording layer 005 is at least 10 nm but not more than 15 nm.

By forming the recording layer 005 using the material composition of Embodiment 1 and allowing the recording layer 005 to have a thickness of at least 10 nm but not more than 15 nm, it is possible to increase the reflectance of the information layer (here, the first information layer 011) located farthest from the laser beam incident side as well as to increase the reflectance ratio, even in the case of a high-capacity optical information recording medium including at least three information layers on and from which information can be recorded and reproduced by the irradiation with the laser beam. This makes it possible to ensure a sufficient amount of reproducing beam, and distinguish a recorded region from an unrecorded region more clearly even in the case of recording and reproducing information at a high recording density.

The achieving both of the satisfactory reflectance and reflectance ratio at the same time depends mainly on the values of refractive index and extinction coefficient of the recording layer when the recording layer is in the crystalline state as well as those when the recording layer is in the amorphous state. Moreover, it results from the fact that both of the relatively high reflectance and reflectance ratio tend to be achieved easily by adjusting the thickness of the recording layer 005, and the materials and thicknesses of the first dielectric layer 003 and the second dielectric layer 007 described above.

When a central composition of the recording material of Embodiment 1, that is, a composition represented by $Ge_xSb_yTe_z$ in atomic number ratio, where x=0.44, y=0.05, and z=0.51, is used for the recording layer 005, and the refractive index of the recording layer 005 is referred to as n and the extinction coefficient of the recording layer 005 is referred to as k with respect to the laser beam 040 at a wavelength of 405 nm, n is 1.6 and k is 3.6 when the recording layer 005 is in the crystalline state. When the recording layer 005 is in the amorphous state, n is 3.0 and k is 2.2.

When the recording material of Embodiment 1 is used for the recording layer 005 and the recording layer 005 has a thickness of at least 10 nm but not more than 15 nm, it is possible to satisfy sufficiently the optical properties of the optical information recording medium 100 by adjusting appropriately the materials and thicknesses of the films other than the recording layer 005.

Furthermore, when the recording material of Embodiment 1 is used for the recording layer 005 and the recording layer 005 has a thickness of at least 10 nm but not more than 15 nm, it becomes easy to record and reproduce information at a higher recording density than before, and it is possible to satisfy sufficiently the rewriting performance of the information recording medium.

A possible cause of this, although the reason is not certain, is that the temperature and time at which the recording layer 005 turns from the amorphous state to the crystalline state, the temperature and time at which the recording layer 005 turns from the crystalline state to the amorphous state, and the heat conductivity of the recording material are optimized for high density recording, and recorded marks are formed stably.

Moreover, when the recording material and the thickness of Embodiment 1 are used for the recording layer 005, the crystallization ability and amorphousization ability of the recording layer 005 are kept in balance, and also the archival characteristics of amorphous recorded marks can be ensured sufficiently.

More specifically, use of the composition of the recording material and the thickness of the recording layer 005 described in Embodiment 1 allows the recording medium to satisfy all of the optical properties, recording and reproducing properties, and archival characteristics at the same time.

From the optical viewpoint, the molar ratio of the GeTe compound to the $Sb_2Te_3$ compound, that is, the value of $(GeTe)/(Sb_2Te_3)$, preferably is at least 9. This is because when this ratio increases, the value of extinction coefficient when the recording layer is in the crystalline state can be increased, and thus it becomes easy to achieve both of the high reflectance and high reflectance ratio.

Moreover, from the viewpoint of ensuring the rewriting performance, the value of $(GeTe)/(Sb_2Te_3)$ preferably is 59 or less. When $(GeTe)/(Sb_2Te_3)$ is 59 or less, the amorphousization ability is enhanced and the archival characteristics of the recording medium can be ensured more easily.

The GeTe compound and the $Sb_2Te_3$ compound may contain Sb appropriately within the range of the amount of Sb contained in the recording material of Embodiment 1, that is, in the range of at least 2 atom % but less than 11 atom %. Thereby, the amorphousization ability of the recording layer 005 can be enhanced. Moreover, less than 11 atom % of Sb can suppress a decrease in the extinction coefficient when the recording layer 005 is in the crystalline state, and make it easy to maintain the high reflectance ratio of the recording medium.

In Embodiment 1, the recording layer 005 has a thickness of at least 10 nm but not more than 15 nm. This is because a thickness of 10 nm or more makes it easy to maximize the reflectance ratio. Moreover, a thickness of 15 nm or less can enhance the amorphousization ability of the recording layer and ensure the archival characteristics of the recording medium.

As another embodiment of the recording layer 005, there can be mentioned an embodiment (hereinafter referred to as Embodiment 2) in which the recording layer 005 is composed of Ge, Sb, and Te, and when the composition of the recording layer 005 is represented by $Ge_xSb_yTe_z$ in molar ratio, x, y, and z satisfy $0.05 \leq x \leq 0.15$, $0.70 \leq y \leq 0.80$, $0.05 \leq z \leq 0.25$ and $x+y+z=1$. In Embodiment 2, the recording layer 005 has a thickness of at least 7.0 nm but not more than 12.0 nm.

By forming the recording layer 005 using the above-mentioned recording material of Embodiment 2 and allowing the recording layer 005 to have a thickness of at least 7 nm but not more than 12 nm, it is possible to increase the reflectance of the information layer (here, the first information layer 011) located farthest from the laser beam incident side as well as to increase the reflectance ratio, even in the case of a high-capacity optical information recording medium including at least three information layers on and from which information can be recorded and reproduced by the irradiation with the laser beam. This makes it possible to ensure a sufficient amount of reproducing beam, and distinguish the recorded region from the unrecorded region more clearly even in the case of recording and reproducing information at a high recording density.

As described in Embodiment 1, the achieving both of the satisfactory reflectance and reflectance ratio at the same time depends mainly on the values of refractive index and extinction coefficient of the recording layer when the recording layer is in the crystalline state as well as those when the recording layer is in the amorphous state. Moreover, it results from the fact that both of the relatively high reflectance and reflectance ratio tend to be achieved easily by adjusting the thickness of the recording layer 005, and the materials and thicknesses of the first dielectric layer 003 and the second dielectric layer 007 described above.

When a central composition of the recording material of Embodiment 2, that is, a composition in which $x=0.10$, $y=0.75$, $z=0.15$, is used for the recording layer 005, and the refractive index of the recording layer 005 is referred to as n and the extinction coefficient of the recording layer 005 is referred to as k with respect to the laser beam at a wavelength of 405 nm, n is 1.3 and k is 3.6 when the recording layer 005 is in the crystalline state. When the recording 005 is in the amorphous state, n is 2.6 and k is 3.1.

Furthermore, when the recording material of Embodiment 2 is used for the recording layer 005 and the recording layer 005 has a thickness of at least 7 nm but not more than 12 nm, it is possible to satisfy sufficiently the rewriting performance of the optical information recording medium.

More specifically, it is possible to achieve the crystallization ability and amorphousization ability of the recording layer 005 appropriate for high density recording, and ensure sufficiently not only the rewriting performance but also the archival characteristics of the recorded signals.

In Embodiment 2, the amount of Sb contained in the recording layer 005 is at least 70 atom % but not more than 80 atom %. 70 atom % or more of Sb can enhance the crystallization ability of the recording layer 005 and make it easy to ensure the erasing properties. 80 atom % or less of Sb can enhance the amorphousization ability of the recording layer 005 and make it easy to ensure the archival characteristics.

When the recording material of Embodiment 2 is used for the recording layer 005, the thickness of the recording layer 005 is at least 7 nm but not more than 12 nm. A thickness of 7 nm or more makes it possible to achieve a reflectance of 1% or more, and a thickness of 12 nm or less makes it possible to keep a reflectance ratio at 4% or more. Thereby, it becomes easy to distinguish the recorded region from the unrecorded region more clearly.

When the recording material described in Embodiment 1 is used for the recording layer 005, the first information layer 011 is required to have a reflectance ratio of at least 6.0 but not more than 12.0. When the recording material described in Embodiment 2 is used for the recording layer 005, the first information layer 011 is required to have a reflectance ratio of at least 4.0 but not more than 5.0. As just described, the reflectance ratio required in Embodiment 1 is different significantly from that required in Embodiment 2.

Conceivably, the reason for the above-mentioned phenomena is as follows, although this is a surmise. In Embodiment 1 in which a compound material is used, a relatively high reflectance ratio is needed because when an amorphous region and a crystalline region are formed, these regions tend to interfere with each other thermally and the edge of the amorphous recorded mark tends to be rough easily. In contrast, in Embodiment 2 in which an eutectic material is used, the edge of the amorphous recorded mark is less likely to be rough because the amorphous region and the crystalline region are less likely to interfere with each other thermally when they are formed. Hence, in Embodiment 2, it is possible to distinguish the amorphous region from the crystalline region clearly even when the reflectance ratio is relatively low.

When the recording layer 005 is as in Embodiment 2, the first interface layer 004, for example, may be omitted. In this case, the first information layer 011 has a film structure including the reflective layer, the first dielectric layer, the recording layer, the interface layer, and the second dielectric layer disposed sequentially from the side opposite to the laser beam incident side.

Next, the first optical separation layer 008 and the second optical separation layer 009 will be described. The first optical separation layer 008 is provided to distinguish a focal position on the first information layer 011 from a focal position on the second information layer 020. The second optical separation layer 009 is provided to distinguish a focal position on the second information layer 020 from a focal position on the third information layer 030.

As the material for the first optical separation layer 008 and the second optical separation layer 009, a photocurable resin or a slow-acting thermosetting resin can be used. Preferably, the material has low optical absorption at the wavelength of the laser beam 040 used for recording and reproducing information. The first optical separation layer 008 and the second optical separation layer 009 each need to have a thickness equal to or more than focal depth $\Delta Z$ that is determined in accordance with a numerical aperture (NA) of an objective lens and wavelength $\lambda$ of the laser beam 040. Assuming that the reference of the optical intensity at a focal point is 80% of the optical intensity in the case of aberration free, $\Delta Z$ can be approximated by $\Delta Z = \lambda / \{2(NA)^2\}$. When $\lambda = 400$ nm and NA=0.6, $\Delta Z = 0.556$ μm, and ±0.6 μm therefrom is regarded as being within the focal depth. Thus, the thicknesses of the first optical separation layer 008 and the second optical separation layer 009 need to be 1.2 μm or more in this case.

A distance between the first information layer 011 and the second information layer and a distance between the second information layer 020 and the third information layer 030 need to fall within a range that allows the objective lens to focus the laser beam 040. Therefore, it is preferable that the total of the thickness of the first optical separation layer 008, the thickness of the second optical separation layer 009, and the thickness of the cover layer 004 falls within a tolerance of a substrate thickness allowable to the objective lens. Accordingly, it is preferable that the thicknesses of the first optical separation layer 008 and the second optical separation layer 009 are in the range of 1.2 μm to 50 μm.

The first optical separation layer 008 and the second optical separation layer 009 can be formed by, for example, spin-coating a photocurable resin or a slow-acting thermosetting resin on the second dielectric layer 007 of the first information layer 011 and the second dielectric layer (not shown) of the second information layer 020, respectively, and then curing the resin. When the first optical separation layer 008 and the second optical separation layer 009 each have a guide groove on a surface thereof on the laser beam 040 incident side, the guide groove can be formed by placing a substrate (mold) with a groove on the resin that has not been cured yet and then curing the resin, and thereafter separating the substrate (mold) therefrom.

The cover layer 010 has a function of protecting the thin film material of the third information layer 030. The cover layer 010 can be formed by applying, by a spin coat method, an ultraviolet curable resin such as a polyester acrylate resin, and then curing the resin by irradiation with ultraviolet rays.

Although not illustrated, a substrate that functions as an optical separation layer may be disposed instead of the cover layer 010, and a light-transmitting information layer further may be provided on the laser beam incident side of the substrate. That is, the configuration of the present invention is applicable also when the optical information recording medium includes four or more information layers, although FIG. 1 shows the optical information recording medium including three information layers. The present embodiment describes an example in which the information layer of the present invention is used as the first information layer located farthest when viewed from the laser beam incident side of the optical information recording medium including three information layers. However, the present invention is not limited to this. For example, the information layer of the present invention may be used for the optical information recording medium including one or two information layers. Moreover, the configuration of the information layer of the present invention can be used for an information layer other than the information layer located farthest when viewed from the laser beam incident side. The effects of the present invention are not lost even in these cases.

It is possible to record and reproduce information on and from the optical information recording medium 100 of the present embodiment by using a recording and reproducing method in which information is recorded and reproduced at a linear velocity of at least 6.9 m/s but not more than 8.8 m/s.

EXAMPLES

Hereafter, the optical information recording medium of the present invention will be described in further detail with reference to examples.

The optical information recording media produced in the present example each had the same configuration as that of the optical information recording medium 100 shown in FIG. 1. Hereinafter, the optical information recording media of the present example will be described using the reference numerals shown in FIG. 1.

Example 1

Each of the optical information recording media of Example 1 had the recording layer of Embodiment 1 described in the embodiment, and was produced as follows.

First, a 1.1 mm-thick polycarbonate substrate (with a diameter of 120 mm) having a guide groove transferred thereto was used as the substrate 001.

The layers were formed sequentially on the polycarbonate substrate 001, by sputtering, to form the first information layer 011. Specifically, an Ag—Pd—Cu layer (with a thickness of 100 nm) to serve as the reflective layer 002, a $TiO_2$ layer (with a thickness of 15 nm) to serve as the first dielectric layer 003, a $(ZrO_2)_{25}(SiO_2)_{25}(Cr_2O_3)_{50}$ (mol %) layer (with a thickness of 2 nm) to serve as the first interface layer 004, a Ge—Sb—Te layer (with a thickness of 12 nm) to serve as the recording layer 005, a $(ZrO_2)_{25}(SiO_2)_{25}(Cr_2O_3)_{50}$ (mol %) layer (with a thickness of 2 nm) to serve as the second interface layer 006, a $ZnS$—$SiO_2$ layer (with a thickness of 55 nm, containing 80 mol % of ZnS and 20 mol % of $SiO_2$) to serve as the second dielectric layer 007 were formed sequentially by the sputtering method. The thickness of the second dielectric layer 007 was adjusted appropriately.

The reflective layer 002 was formed using an $Ag_{97}Pd_2Cu_1$ (wt %) material by DC sputtering with Ar gas being introduced.

The first dielectric layer 003 was formed using a $TiO_2$ sputtering target by DC pulse sputtering with Ar gas being introduced.

The first interface layer 004 and the second interface layer 006 were formed using a $(ZrO_2)_{25}(SiO_2)_{25}(Cr_2O_3)_{50}$ (mol %) target by RF sputtering with Ar gas being introduced.

For the recording layer 005, a material obtained by mixing GeTe and $Sb_2Te_3$ at a specified ratio was used. The recording layer 005 was formed using the mixed material of Ge—Sb—Te, by DC pulse sputtering with Ar gas being introduced at $2.0 \times 10^{-7}$ m$^3$/s (12 sccm). The degree of vacuum in a film formation chamber used at this time was approximately $1.2 \times 10^{-1}$ Pa. The sputtering power was 0.65 W/cm$^2$.

In order for the sputter-deposited recording layer 005 to have a composition containing GeTe and $Sb_2Te_3$ at a specified ratio, a correction coefficient for correcting a difference between the composition of the sputter-deposited film and the composition of the sputtering target was determined in advance from an empirical rule, and a sputtering target that allowed a desired film composition to be obtained was used.

Subsequently, the second dielectric layer 007 was formed using a material obtained by mixing ZnS and $SiO_2$ at 4:1 (in molar ratio), by RF sputtering with Ar gas being introduced.

In Example 1, sample media in which the respective recording layers 005 are composed of different compositions were produced in order to study how the compositions of the recording layers 005 affected the medium properties.

The sample in which the molar ratio of GeTe to $Sb_2Te_3$ (GeTe/$Sb_2Te_3$) was 8 in the composition of the recording layer 005 was referred to as Sample 1-1. The sample in which the molar ratio was 10 was referred to as Sample 1-2. The sample in which the molar ratio was 22 was referred to as Sample 1-3. The sample in which the molar ratio was 50 was referred to as Sample 1-4. The sample in which the molar ratio was 70 was referred to as Sample 1-5. The compositions of the recording layers 005 were analyzed using samples prepared separately for elemental analyses, each formed of only the respective recording layer, by an ICP emission spectrochemical analysis method. Table 1 shows the target ratios of elements, and the results of the film composition analysis of the sputter-deposited films.

TABLE 1

| Sample | Ratio (GeTe/$Sb_2Te_3$) | Target ratios of elements (atom %) | | | Analysis results (atom %) | | |
|---|---|---|---|---|---|---|---|
| | | Ge | Sb | Te | Ge | Sb | Te |
| 1-1 | 8 | 38.1 | 9.5 | 52.4 | 38.5 | 9.2 | 52.3 |
| 1-2 | 10 | 40.0 | 8.0 | 52.0 | 39.8 | 8.1 | 52.1 |
| 1-3 | 22 | 44.9 | 4.1 | 51.0 | 44.8 | 4.3 | 50.9 |
| 1-4 | 50 | 47.6 | 1.9 | 50.5 | 47.5 | 2.0 | 50.5 |
| 1-5 | 70 | 48.3 | 1.4 | 50.3 | 48.3 | 1.4 | 50.3 |

In Table 1, in the case where, for example, the molar ratio (GeTe/$Sb_2Te_3$) is 8, "the target ratio of element" is represented by "$Ge_{38.1}Sb_{9.5}Te_{52.4}$ (atom %)" that is a composition formula taking the total number of "Ge" atoms, "Sb" atoms, and "Te" atoms as a reference (100 atom %).

The resultant sputter-deposited film contained 38.5 atom % of Ge, 9.2 atom % of Sb, and 52.3 atom % of Te. This is represented by $Ge_{0.385}Sb_{0.092}Te_{0.523}$ as a composition in atomic number ratio.

Subsequently, in each of Samples 1-1 to 1-5, an ultraviolet curable resin was applied onto the second dielectric layer 007 by a spin coat method, and then a substrate (mold) with a groove was placed on the resin that had not been cured yet, and thereafter the resin was cured. Then, the substrate (mold) was separated from the cured resin. Thus, the first optical separation layer 008 having a guide groove and a thickness of 25 μm was formed.

Subsequently, each of the media in which layers from the reflective layer 002 to the first optical separation layer 008 had been formed on the substrate 001 was put into a vacuum apparatus, and the respective layers composing the second information layer 020 were formed by sputtering.

To form the second information layer 020, a $TiO_2$ layer (with a thickness of 18 nm) to serve as the transmittance adjusting layer, an Ag—Pd—Cu layer (with a thickness of 10 nm) to serve as the reflective layer, a $ZrO_2$—$SiO_2$—$Cr_2O_3$ layer (with a thickness of 12 nm) to serve as the first dielectric layer, a $Ge_{22}Sb_2Te_{25}$ layer (with a thickness of 7 nm) to serve as the recording layer, a $ZrO_2$—$Cr_2O_3$ layer (with a thickness of 5 nm) to serve as the interface layer, and a ZnS—$SiO_2$ layer (with a thickness of 45 nm, containing 20 mol % of $SiO_2$) to serve as the second dielectric layer were stacked sequentially.

Subsequently, an ultraviolet curable resin was applied onto the second information layer 020, and then a substrate (mold) with a groove was placed on the resin that had not been cured yet, and thereafter the resin was cured. Then, the substrate (mold) was separated from the cured resin. Thus, the second optical separation layer 009 having a guide groove and a thickness of 18 μm was formed (the respective layers are not shown in FIG. 1).

Separately, an information layer having the same film structure as that of the second information layer 020 was formed on a transparent substrate, and measured for transmittance at both of a portion in which the recording layer had been crystallized with an initialization device and an amorphous portion in which the recording layer had not been initialized. A spectroscope was used for the transmittance measurements. The transmittances were measured at wavelength λ=405 nm. As a result, the transmittance at the crystallized portion was 48% and the transmittance at the amorphous portion was 50%.

Subsequently, each of the media in which layers from the first information layer 011 to the second optical separation layer 009 had been formed on the substrate 001 was put into the vacuum apparatus, and the respective layers composing the third information layer 030 were formed by sputtering. To form the third information layer 030, a $TiO_2$ layer (with a thickness of 16 nm) to serve as the transmittance adjusting layer, an Ag—Pd—Cu layer (with a thickness of 8 nm) to serve as the reflective layer, a $ZrO_2$—$SiO_2$—$Cr_2O_3$ layer (with a thickness of 9 nm) to serve as the first dielectric layer, a $Ge_{22}Sb_2Te_{25}$ layer (with a thickness of 6 nm) to serve as the recording layer, a $ZrO_2$—$Cr_2O_3$ layer (with a thickness of 3 nm) to serve as the interface layer, and a ZnS—$SiO_2$ layer (with a thickness of 35 nm, containing 20 mol % of $SiO_2$) to serve as the second dielectric layer were stacked sequentially.

Separately, an information layer having the same film structure as that of the third information layer 030 was formed on a transparent substrate, and measured for transmittance at both of a portion in which the recording layer had been crystallized with the initialization device and an amorphous portion in which the recording layer had not been initialized.

The transmittances were measured at wavelength λ of 405 nm. As a result, the transmittance at the crystallized portion was 52% and the transmittance at the amorphous portion was 53%.

Subsequently, an ultraviolet curable resin was applied onto the third information layer 030, spin-coated, and then irradiated with ultraviolet rays and cured to form the cover layer 010 (57 μm). Thus, the optical information recording medium 100 including three information layers was obtained.

The cover layer 010 was formed using a polyester acrylate material.

In each of the optical information recording media of the present example thus formed, the recording layer 005 of the first information layer 011, the recording layer of the second information layer 020, and the recording layer of the third information layer 030 were initialized using the initialization device, and the first information layer 011 was evaluated for recording and reproducing properties. The evaluation method is as follows.

The recording and reproducing apparatus used for the evaluation of recording and reproducing properties was a recording and reproducing apparatus including a spindle motor for rotating the optical information recording medium, an optical head provided with a semiconductor laser, and an objective lens for focusing the laser beam emitted from the semiconductor laser.

Recording, erasing, and overwrite recording of information with respect to the optical information recording media were performed through modulation of the laser beam power between a peak power (Pp (mW)) that is a high power and a bias power (Pb (mW)) that is a low power. The irradiation with the laser beam at the peak power forms an amorphous phase in a local area of the recording layer 005, and the amorphous phase serves as a recorded mark. The area between recorded marks is irradiated with the laser beam at the bias power, and thereby a crystalline phase (erased region) is formed. In the case of irradiation with the laser beam at the peak power, it is common to use a so-called multipulse composed of pulse trains. The multipulse may be modulated at levels of the peak power and the bias power, or may be modulated at levels of a power in the range of 0 mW to the peak power.

A reproducing power (Pr (mW)) is defined as a power that is lower than both of the peak power level and the bias power level, does not affect the optical state of the recorded marks by irradiation with the laser beam at the power level thereof, and allows a sufficient amount of reflected light to be obtained from the optical information recording medium to reproduce the recorded marks. Information is reproduced by reading, with a detector, signals from the optical information recording medium obtained by irradiating the medium with the laser beam at the reproducing power.

Preferably, the numerical aperture (NA) of the objective lens is in the range of 0.5 to 1.1 (more preferably, in the range of 0.6 to 1.0) in order to adjust the spot diameter of the laser beam within the range of 0.4 μm to 0.7 μm. Preferably, the wavelength of the laser beam 040 is 450 nm or less (more preferably, in the range of 350 nm to 450 nm). Preferably, the linear velocity at which information is recorded on the optical information recording medium is in the range of 3 m/second to 20 m/second (more preferably, in the range of 4 m/second to 15 m/second) in which crystallization is less likely to be caused by the reproducing beam and a sufficient erasure rate can be obtained.

In the present example, the evaluation of recording and reproducing properties was made under the conditions that the wavelength of the laser beam was 405 nm, the numerical aperture (NA) of the objective lens was 0.85, the linear velocity at the time of measuring the sample was 7.4 m/s, the shortest mark length (2T) was 0.111 μm, the longest mark length (9T) was 0.502 μm, the track pitch of the guide groove formed on the substrate 001 was 0.32 μm, and information was recorded in the groove.

When recording was performed with respect to the first information layer 011, the laser beam was focused on the recording layer 005 and information was recorded on the recording layer 005 by using the laser beam 040 that had transmitted through the cover layer 010, the third information layer 030, and the second information layer 020. Reproduction was performed by using the laser beam that had been reflected by the recording layer 005 and transmitted through the second information layer 020, the third information layer 030, and the cover layer 010.

The reflectance was measured by irradiating the initialized groove track and the non-initialized groove track of the first information layer 011 with the laser beam at a reproducing power of 1.0 mW. The reflectance from the initialized region of the first information layer 011 was referred to as Rc (%), and the reflectance from the non-initialized region of the first information layer 011 was referred to as Ra (%).

In addition, Rc/Ra was calculated as a reflectance ratio.

The recording performance (recording and reproducing properties) were evaluated by recording a 9T mark by a 1-7 pp modulation method and measuring an amplitude (Amp) and carrier to noise ratio (CNR) of the 9T mark with a spectrum analyzer. With respect to the 9T Amp, ⊚ indicates at least −5 dBm, ○ indicates at least −8 dBm but less than −5 dBm, Δ indicates at least −10 dBm but less than −8 dBm, and x indicates less than −10 dBm. With respect to the CNR, ⊚ indicates at least 56 dB, ○ indicates at least 53 dB but less than 56 dB, Δ indicates at least 51 dB but less than 53 dB, and x indicates less than 51 dB.

The erasing performance (rewriting performance) was evaluated as follows. A 9T mark was recorded by the 1-7 pp modulation method and its amplitude was measured with a spectrum analyzer. The 9T mark was overwritten with a 2T mark and the amplitude of the 9T signal was measured again to calculate the attenuation rate of the 9T signal. Hereinafter, the attenuation rate of the 9T signal is referred to as an erasure rate.

With respect to the erasure rate, ⊚ indicates less than −45 dB, ○ indicates at least −45 dB but less than −40 dB, Δ indicates at least −40 dB but less than −35 dB, and x indicates at least −35 dB.

The RF level when the 9T signal was recorded was read from an oscilloscope, and a ratio of (Ic−Ia) to Ic ((Ic−Ia)/Ia) was calculated as 9T modulation degree (recording and reproducing properties), where Ic (mV) denotes the level of the amount of reflected light from the crystalline region, Ia (mV) denotes the level of the amount of reflected light from the amorphous region, and (Ic−Ia) denotes the difference between Ic and Ia.

With respect to the modulation degree, ⊚ indicates at least 45%, ○ indicates at least 42% but less than 45%, Δ indicates at least 40% but less than 42%, and x indicates less than 40%.

A life test of recorded signal (evaluation of archival characteristics) was conducted as follows. A medium on which a 2T signal had been recorded in advance was subject to an accelerated test at 80° C. and 20% RH (Relative Humidity) for 50 hours. Then, the track with the 2T signal recorded therein was reproduced to evaluate the difference in CNR between before and after the accelerated test (amount of archival deterioration).

With respect to the amount of archival deterioration, ⊚ indicates 0.5 dB or less, ○ indicates at least 0.5 dB but less than 1.0 dB, Δ indicates at least 1.0 dB but less than 1.5 dB, and x indicates at least 1.5 dB.

The rewriting performance after the life test was evaluated as follows. A medium on which a 9T signal had been recorded in advance was subject to an accelerated test at 80° C. and 20% RH for 50 hours. Then, the 9T signal was overwritten with a 2T mark, and thereafter, the amplitude of the 9T signal was measured once again to measure the erasure rate (erasure rate after the accelerated test) of the 9T signal. This erasure rate was compared with the erasure rate measured before the accelerated test. Thus, the rewriting performance after the life test was evaluated (amount of archival overwrite deterioration).

With respect to the difference between the erasure rate before the accelerated test and the erasure rate after the accelerated test, ⊚ indicates 1.5 dB or less, ○ indicates at least 1.5 dB but less than 3.0 dB, Δ indicates at least 3.0 dB but less than 5.0 dB, and x indicates at least 5.0 dB.

Table 2 shows the evaluation results of Samples 1-1 to 1-5.

Sample 1-1 was evaluated as x also for the 9T modulation degree. Sample 1-1 was not evaluated as x for any other evaluation item. Accordingly, Sample 1-1 was evaluated as x in the comprehensive evaluation.

In Sample 1-2 with the recording layer 005 having a composition in which the molar ratio (GeTe/$Sb_2Te_3$) was 10, it was possible to achieve both of the high Rc and high Rc/Ra by allowing the second dielectric layer 007 to have a thickness of 53 nm. The Rc/Ra was increased to 6.5, and 9T Amp, 9T C/N, and 9T modulation degree were enhanced to Δ. Sample 1-2 was not evaluated as x for any other evaluation item, either. Accordingly, Sample 1-2 was evaluated as Δ in the comprehensive evaluation.

In Sample 1-3 with the recording layer 005 having a composition in which the molar ratio (GeTe/$Sb_2Te_3$) was 22, it was possible to achieve both of the high Rc and high Rc/Ra by allowing the second dielectric layer 007 to have a thickness of 55 nm. The Rc/Ra was increased to 8.2, and 9T Amp, 9T C/N, and 9T modulation degree were enhanced to ○. Sample 1-3 was not evaluated as x for any other evaluation item, either. Accordingly, Sample 1-3 was evaluated as ○ in the comprehensive evaluation.

TABLE 2

| Sample | 10-15 Thickness of recording layer nm | 9-20 Thickness of first dielectric layer nm | 45-65 Thickness of second dielectric layer nm | 1-3 Rc % | 6-12 Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 1-1 | 12 | 15 | 54 | 1.2 | 5.8 | X | X | Δ | X | Δ | ○ | X |
| 1-2 | 12 | 15 | 53 | 1.5 | 6.5 | Δ | Δ | ○ | Δ | Δ | ○ | Δ |
| 1-3 | 12 | 15 | 55 | 2 | 8.2 | ○ | ○ | ○ | ○ | ○ | ○ | ○ |
| 1-4 | 12 | 15 | 51 | 2.4 | 9 | ⊚ | ⊚ | ○ | ⊚ | ○ | Δ | Δ |
| 1-5 | 12 | 15 | 52 | 2.8 | 9.2 | ⊚ | ⊚ | ○ | ⊚ | ○ | X | X |

Table 2 also shows the results of comprehensive evaluations on respective samples based on the above-mentioned evaluation results. The comprehensive evaluations were made in accordance with the following criteria. ○ indicates that all of the 9T Amp, 9T C/N, 9T/2T erasure rate, 9T modulation degree, amount of archival deterioration, and amount of archival overwrite deterioration were evaluated as ○ or better (○ or ⊚). Δ indicates that at least one of these items was evaluated as Δ. x indicates that at least one of these items was evaluated as x.

The samples evaluated as ○ or Δ in the comprehensive evaluation satisfy the requirements for the recording layer of the present invention, and used as examples. In contrast, the samples evaluated as x in the comprehensive evaluation includes a recording layer whose composition fails to satisfy the requirements for the recording layer (the composition of the recording material) of the present invention, and used as comparative examples.

The thickness of the second dielectric layer 007 in each of the samples was determined so that 1% or more of Rc can be ensured, and Rc/Ra can be high within the range that allows Rc to be maintained as high as possible.

In Sample 1-1 with the recording layer 005 having a composition in which the molar ratio (GeTe/$Sb_2Te_3$) was 8, it was possible to ensure 1% or more of Rc when the thickness of the second dielectric layer 007 was 54 nm or more. When the thickness exceeded 54 nm, Rc was increased but Rc/Ra was decreased. Thus, the thickness of the second dielectric layer 007 was determined to be 54 nm.

In Sample 1-1, the Rc/Ra was as low as 5.8. As a result, Sample 1-1 was evaluated as x for the 9T Amp and 9T C/N.

In Sample 1-4 with the recording layer 005 having a composition in which the molar ratio (GeTe/$Sb_2Te_3$) was 50, it was possible to achieve both of the high Rc and high Rc/Ra by allowing the second dielectric layer 007 to have a thickness of 51 nm. The Rc/Ra was increased further to 9.0, and 9T Amp, 9T C/N, and 9T modulation degree were enhanced to ⊚. Sample 1-4 was evaluated as ○ for the other evaluation items, except for the amount of archival overwrite deterioration evaluated as Δ. Accordingly, Sample 1-4 was evaluated as Δ in the comprehensive evaluation.

In Sample 1-5 with the recording layer 005 having a composition in which the molar ratio (GeTe/$Sb_2Te_3$) was 70, it was possible to achieve both of the high Rc and high Rc/Ra by allowing the second dielectric layer 007 to have a thickness of 52 nm. Sample 1-5 was evaluated as ⊚ for the 9T Amp, 9T C/N, and 9T modulation degree, but evaluated as x for the amount of archival overwrite deterioration. Accordingly, Sample 1-5 was evaluated as x in the comprehensive evaluation.

Additionally, an optical information recording medium (Sample 1-6) including three information layers was produced in the same manner as Sample 1-1, except for that the recording layer 005 had a thickness of 16 nm in order to enhance the 9T Amp, 9T C/N, and 9T modulation degree of Sample 1-1.

Furthermore, an optical information recording medium (Sample 1-7) including three information layers was produced in the same manner as Sample 1-5, except for that the recording layer 005 had a thickness of 16 nm in order to reduce the amount of archival overwrite deterioration of Sample 1-5.

Table 3 shows the evaluation results of Sample 1-6 and Sample 1-7.

TABLE 3

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 1-6 | 16 | 15 | 54 | 1.2 | 7.2 | △ | △ | ○ | △ | X | ○ | X |
| 1-7 | 16 | 15 | 52 | 2.9 | 11.5 | ◎ | ◎ | ○ | ◎ | X | △ | X |

In Sample 1-6, the 9T Amp, 9T C/N, and 9T modulation degree were better than those of Sample 1-1, and Sample 1-6 was evaluated as △ for these items. However, it was evaluated as x for the amount of archival deterioration. Accordingly, Sample 1-6 was evaluated as x in the comprehensive evaluation.

In Sample 1-7, the amount of archival overwrite deterioration was better than that of Sample 1-5, and Sample 1-7 was evaluated as △ for this item. However, it was evaluated as x for the amount of archival deterioration. Accordingly, Sample 1-7 was evaluated as x in the comprehensive evaluation.

The results of Example 1 can be summarized as follows. The samples with the first information layer 011 including the recording layer 005 in which the molar ratio of GeTe to $Sb_2Te_3$ ($GeTe/Sb_2Te_3$) was 10, 22, or 50 were evaluated as ○ or △ in the comprehensive evaluation. In contrast, the samples with the first information layer 011 including the recording layer 005 in which the molar ratio was 8 or 70 were evaluated as x in the comprehensive evaluation.

Specifically, the samples with the recording layer 005 containing 39.8 atom %, 44.8 atom %, or 47.5 atom % of Ge according to the elemental analysis results were evaluated as ○ or △ in the comprehensive evaluation. In contrast, the samples with the recording layer 005 containing 38.5 atom % or 48.3 atom % of Ge were evaluated as x in the comprehensive evaluation.

Regarding the amount of Sb, the samples with the recording layer 005 containing 2.0 atom % to 8.1 atom % of Sb were evaluated as ○ or △ in the comprehensive evaluation.

As shown in the results of Sample 1-6 and Sample 1-7, the media with the recording layer 005 having a thickness of 16 nm or more were evaluated as x for the amount of archival deterioration, and evaluated as x in the comprehensive evaluation.

Example 2

Optical information recording media, each including three information layers, were produced in the same manner as Example 1, except for that the respective recording layers 005 had a composition in which the molar ratio of GeTe to $Sb_2Te_3$ ($GeTe/Sb_2Te_3$) was 22, and furthermore, the recording layers 005 had thicknesses other than 12 nm. Studies were made on these optical information recording media to see how the thickness of the recording layer 005 affected the medium properties. The medium with the recording layer 005 having a thickness of 8 nm was referred to as Sample 2-1. The medium with the recording layer 005 having a thickness of 10 nm was referred to as Sample 2-2. The medium with the recording layer 005 having a thickness of 15 nm was referred to as Sample 2-3.

The medium with the recording layer 005 having a thickness of 17 nm was referred to as Sample 2-4. These media were evaluated in the same manner as in Example 1. Table 4 shows the results thereof. Table 4 also shows the results of Sample 1-3 produced in Example 1 so that the evaluation results of the media can be summarized easily with respect to the thicknesses of the recording layers 005.

TABLE 4

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 2-1 | 8 | 15 | 56 | 1.8 | 5.2 | △ | △ | ○ | X | ◎ | X | X |
| 2-2 | 10 | 15 | 55 | 1.9 | 6.1 | ○ | ○ | ○ | △ | ◎ | △ | △ |
| 1-3 | 12 | 15 | 55 | 2 | 8.2 | ○ | ○ | ○ | ○ | ○ | ○ | ○ |
| 2-3 | 15 | 15 | 55 | 2.1 | 11.5 | ◎ | ◎ | ◎ | ◎ | △ | ◎ | △ |
| 2-4 | 17 | 15 | 54 | 2.2 | 9.8 | ○ | ○ | ○ | ○ | X | ◎ | X |

In Sample 2-1, it was possible to achieve both of the high Rc and high Rc/Ra when the second dielectric layer 007 had a thickness of 56 nm. However, Sample 2-1 had Rc/Ra as low as 5.2 and evaluated as x for the 9T modulation degree and amount of archival overwrite deterioration. Accordingly, Sample 2-1 was evaluated as x in the comprehensive evaluation.

In Sample 2-2, it was possible to achieve both of the high Rc and high Rc/Ra when the second dielectric layer 007 had a thickness of 55 nm. Sample 2-2 was evaluated as △ for the 9T modulation degree, for which Sample 2-1 was evaluated as x. Sample 2-2 was not evaluated as x for any other item, either. Accordingly, Sample 2-2 was evaluated as △ in the comprehensive evaluation.

Also in Sample 2-3, it was possible to achieve both of the high Rc and high Rc/Ra when the second dielectric layer 007 had a thickness of 55 nm. In Sample 2-3, the 9T modulation degree was better than those of Sample 2-2 and 1-3, and Sample 2-3 was evaluated as ○ for this item. Sample 2-3 was evaluated as Δ for the amount of archival deterioration, and was not evaluated as x for any other item, either. Accordingly, Sample 2-3 was evaluated as Δ in the comprehensive evaluation.

Comparisons among Samples 2-2, 1-3, and 2-3 indicate that the Rc/Ra and 9T modulation degree are enhanced when the thickness of the second dielectric layer 007 remains constant and the thickness of the recording layer 005 is increased.

In Sample 2-4, including the recording layer 005 with a thickness of 17 nm, it was possible to achieve both of the high Rc and high Rc/Ra when the second dielectric layer 007 had a thickness of 54 nm. However, Sample 2-4 was evaluated as mation layers, were produced in the same manner as Example 1 (Sample 1-3), except for that the respective second dielectric layers 007 had various thicknesses different from that of Sample 1-3.

The medium in which the second dielectric layer 007 had a thickness of 42 nm was Sample 3-1. The medium in which the second dielectric layer 007 had a thickness of 45 nm was Sample 3-2. The medium in which the second dielectric layer 007 had a thickness of 65 nm was Sample 3-3. The medium in which the second dielectric layer 007 had a thickness of 68 nm was Sample 3-4. Table 6 shows the evaluation results thereof.

TABLE 6

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 3-1 | 12 | 15 | 42 | 0.9 | 10.3 | X | X | ○ | Δ | ○ | ○ | X |
| 3-2 | 12 | 15 | 45 | 1.2 | 9.3 | Δ | Δ | ○ | ○ | ○ | ○ | Δ |
| 1-3 | 12 | 15 | 55 | 2 | 8.2 | ○ | ○ | ○ | ○ | ○ | ○ | ○ |
| 3-3 | 12 | 15 | 65 | 2.8 | 6.1 | Δ | Δ | ○ | Δ | ○ | ○ | Δ |
| 3-4 | 12 | 15 | 68 | 3.1 | 4.8 | X | X | ○ | X | ○ | ○ | X | x for the archival deterioration. Accordingly, Sample 2-4 was evaluated as x in the comprehensive evaluation.

The above-mentioned results of Samples 2-1 to 2-4 indicate that it is necessary for the recording layer 005 to have a thickness of at least 10 nm but not more than 15 nm in order to realize all of the satisfactory recording and reproducing properties, archival characteristics, and rewriting performance.

Additionally, an optical information recording medium (Sample 2-5) including three information layers was produced in the same manner as Sample 2-4, except for that the recording layer 005 had a composition in which the molar ratio of GeTe to $Sb_2Te_3$ ($GeTe/Sb_2Te_3$) was 31 in order to reduce the amount of archival deterioration of Sample 2-4. Table 5 shows the evaluation results thereof.

In Sample 3-1, the Rc/Ra was as high as 10.3 but the Rc was as low as 0.9%. Thus, Sample 3-1 was evaluated as x for the 9T Amp and 9T C/N due to the insufficient amount of reflected light. Accordingly, Sample 3-1 was evaluated as x in the comprehensive evaluation.

In Sample 3-2, the Rc/Ra was slightly lower but the Rc was higher than in Sample 3-1. Sample 3-2 was evaluated as Δ for the 9T Amp and 9T C/N, and not evaluated as x for any other item, either. Accordingly, Sample 3-2 was evaluated as Δ in the comprehensive evaluation.

In Sample 3-3, the Rc was increased but the Rc/Ra was lowered slightly. Thus, Sample 3-3 was evaluated as Δ for the 9T Amp and 9T C/N. Sample 3-3 was not evaluated as x for any other item, either. Accordingly, Sample 3-3 was evaluated as Δ in the comprehensive evaluation.

TABLE 5

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 2-5 | 17 | 15 | 52 | 2.3 | 10.1 | ⊚ | ⊚ | ○ | ○ | X | ⊚ | X |

In Sample 2-5, the second dielectric layer 007 had a thickness of 52 nm. As shown in the results, the archival deterioration was not reduced against expectation and Sample 2-5 was evaluated as x for this item. Accordingly, Sample 2-5 was evaluated as x in the comprehensive evaluation.

As a result, the present experiment also proved that it was appropriate for the recording layer 005 to have a thickness of 10 nm to 15 nm.

Example 3

In the present example, studies were made to see how the thickness of the second dielectric layer 007 affected the medium properties. Optical information recording media referred to as Sample 3-1 to 3-4, each including three infor- In Sample 3-4, the Rc was high but the Rc/Ra was lowered to 4.8. Thus, Sample 3-4 was evaluated as x for the 9T Amp, 9T C/N, and 9T modulation degree. Accordingly, Sample 3-4 was evaluated as x in the comprehensive evaluation.

Additionally, an optical information recording medium (Sample 3-5) including three information layers was produced in the same manner as Sample 3-1, except for that the recording layer 005 had a thickness of 15 nm in order to enhance the 9T Amp and 9T C/N of Sample 3-1.

An optical information recording medium (Sample 3-6) including three information layers was produced in the same manner as Sample 3-4, except for that the recording layer 005 had a thickness of 15 nm in order to enhance the 9T Amp, 9T C/N, and 9T modulation degree of Sample 3-4.

An optical information recording medium (Sample 3-7) including three information layers was produced in the same manner as Sample 3-4, except for that the recording layer 005 had a composition in which the ratio of GeTe to $Sb_2Te_3$ (GeTe/$Sb_2Te_3$) was 80 and the recording layer 005 had a thickness of 15 nm in order to enhance the 9T Amp, 9T C/N, and 9T modulation degree of Sample 3-4.

Table 7 shows the evaluation results of Sample 3-5, 3-6, and 3-7.

However, from the viewpoint of mass productivity and reliability, it is desirable to use ZnS-20 mol % $SiO_2$ because of its high sputtering rate and excellent corrosion resistance.

Example 4

Optical information recording media, each including three information layers, were produced in the same manner as Example 1, except for that the respective recording layers 005

TABLE 7

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 3-5 | 15 | 15 | 42 | 0.9 | 10.3 | X | X | ○ | Δ | X | ○ | X |
| 3-6 | 15 | 15 | 68 | 3.2 | 6.8 | Δ | Δ | ○ | Δ | X | ○ | X |
| 3-7 | 15 | 15 | 68 | 3.5 | 7 | Δ | Δ | ○ | Δ | Δ | X | X |

Like Sample 3-1, Sample 3-5 was evaluated as x for the 9T Amp and 9T C/N. It was evaluated as x for the archival deterioration, too. Accordingly, Sample 3-5 was evaluated as x in the comprehensive evaluation.

In Sample 3-6, the Rc/Ra was increased to 6.8, which was higher than that of Sample 3-4. Sample 3-6 was evaluated as Δ for the 9T Amp and 9T C/N but evaluated as x for the archival deterioration. Accordingly, Sample 3-6 was evaluated as x at the comprehensive evaluation.

In Sample 3-7, the Rc/Ra was increased to 7.0, which was higher than that of Sample 3-4. Sample 3-7 was evaluated as Δ for the 9T Amp and 9T C/N but evaluated as x for the archival overwrite deterioration. Accordingly, Sample 3-7 was evaluated as x in the comprehensive evaluation.

The results of Example 3 can be summarized as follows. As indicated by the results of Sample 3-1, sample 3-2, sample 1-3, sample 3-3, and sample 3-4, it is preferable for the second dielectric layer 007 to have a thickness of at least 45 nm but not more than 65 nm when the recording layer 005 has a composition in which the ratio of GeTe to $Sb_2Te_3$ (GeTe/$Sb_2Te_3$) was 22, the first dielectric layer has a thickness of 15 nm, and ZnS-20 mol % $SiO_2$ is used as the material of the second dielectric layer 007.

Sample 3-5, Sample 3-6, and Sample 3-7, which were enhanced in terms of the items for which Sample 3-1 and 3-4 were evaluated as x, were enhanced in terms of some items but evaluated as x for the other items. Accordingly, Sample 3-5, Sample 3-6, and Sample 3-7 were evaluated as x in the comprehensive evaluation.

In the present example, ZnS-20 mol % $SiO_2$ (having a refractive index of 2.20 and an extinction coefficient of 0.02 with respect to a laser beam at a wavelength of 405 nm) was used for the second dielectric layers 007. However, it also is possible to use, for example, a material having a refractive index equivalent to that of the above-mentioned material, such as a material (having a refractive index of 2.30 and an extinction coefficient of 0.05 with respect to a laser beam at a wavelength of 405 nm) obtained by mixing 25 mol % of $ZrO_2$, 25 mol % of $SiO_2$, and 50 mol % of $Cr_2O_3$ together.

were formed using materials obtained by adding Sb into base compositions in which the molar ratios of GeTe to $Sb_2Te_3$ (GeTe/$Sb_2Te_3$) were 10, 22, and 50, respectively. The thicknesses of the second dielectric layers were as shown in Table 9.

The purpose of the present example is to study how the evaluation results of the media depend on the composition when Sb is added to the respective compositions mentioned above and the crystallization rate is lowered.

Take the composition obtained by adding Sb into the composition in which the molar ratio of GeTe to $Sb_2Te_3$ (GeTe/$Sb_2Te_3$) is 22, for example. The composition in which the ratio (GeTe/$Sb_2Te_3$) is 22 can be represented by "$Ge_{22}Sb_2Te_{25}$". When 3.0 of Sb is added into this composition, the resultant composition can be represented by "$Ge_{22}Sb_{2+3}Te_{25}$", which is $Ge_{0.423}Sb_{0.096}Te_{0.481}$ when calculated in atomic number ratio.

Table 8 shows, with respect to Samples 4-1 to 4-6 produced in the present example, the molar ratios of GeTe to $Sb_2Te_3$ in the base compositions and the amounts of Sb added therein. In addition, Table 8 shows the target ratios of elements. Table 8 also shows the results of composition analyses that were made on samples prepared separately for elemental analyses, each formed of only the respective recording layer, using the ICP emission spectrochemical analysis method.

TABLE 8

| | | Target ratios of elements (atom %) | | | Analysis results (atom %) | | |
|---|---|---|---|---|---|---|---|
| Sample | Composition ratio of GeSbTe | Ge | Sb | Te | Ge | Sb | Te |
| 4-1 | $Ge_{10}Sb_{2+0.5}Te_{13}$ | 39.2 | 9.8 | 51.0 | 41.5 | 9.1 | 49.4 |
| 4-2 | $Ge_{10}Sb_{2+1}Te_{13}$ | 38.5 | 11.5 | 50.0 | 38.4 | 11.6 | 50.0 |
| 4-3 | $Ge_{22}Sb_{2+3}Te_{25}$ | 42.3 | 9.6 | 48.1 | 42.0 | 9.4 | 48.6 |
| 4-4 | $Ge_{22}Sb_{2+5}Te_{25}$ | 40.7 | 13.0 | 46.3 | 40.4 | 12.7 | 46.9 |
| 4-5 | $Ge_{50}Sb_{2+10}Te_{53}$ | 43.5 | 10.4 | 46.1 | 43.5 | 10.5 | 46.0 |
| 4-6 | $Ge_{50}Sb_{2+12}Te_{53}$ | 42.7 | 12.0 | 45.3 | 42.8 | 11.8 | 45.4 |

Table 9 shows the evaluation results of these samples.

TABLE 9

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 4-1 | 12 | 15 | 49 | 1.5 | 6.6 | Δ | Δ | ○ | Δ | Δ | Δ | Δ |
| 4-2 | 12 | 15 | 47 | 1.4 | 6 | ○ | ○ | X | Δ | ○ | X | X |
| 4-3 | 12 | 15 | 52 | 2 | 7.6 | ○ | ○ | Δ | ○ | ◎ | Δ | Δ |
| 4-4 | 12 | 15 | 50 | 2 | 7.2 | ○ | ○ | X | ○ | ◎ | X | X |
| 4-5 | 12 | 15 | 47 | 2.4 | 8.7 | ◎ | ◎ | Δ | ◎ | ◎ | Δ | Δ |
| 4-6 | 12 | 15 | 47 | 2.4 | 8.3 | ◎ | ◎ | X | ◎ | ◎ | X | X |

In Sample 4-1, the second dielectric layer 007 had a thickness of 49 nm, and both of the high Rc and high Rc/Ra were achieved. Sample 4-1 was evaluated as Δ for the amount of archival overwrite deterioration, for which Sample 1-2 containing no Sb was evaluated as ○. However, Sample 4-1 was not evaluated as x for any other item, either. Accordingly, Sample 4-1 was evaluated as Δ in the comprehensive evaluation.

In Sample 4-2, the second dielectric layer 007 had a thickness of 47 nm, and both of the high Rc and high Rc/Ra were achieved. Sample 4-2 was evaluated as x for the amount of archival overwrite deterioration, for which Sample 1-2 containing no Sb was evaluated as ○. Accordingly, Sample 4-2 was evaluated as x in the comprehensive evaluation.

In Sample 4-3, the second dielectric layer 007 had a thickness of 52 nm, and both of the high Rc and high Rc/Ra were achieved. Sample 4-3 was evaluated as Δ for the amount of archival overwrite deterioration, for which Sample 1-3 containing no Sb was evaluated as ○. However, Sample 4-3 was not evaluated as x for any other item, either. Accordingly, Sample 4-3 was evaluated as Δ in the comprehensive evaluation.

In Sample 4-4, the second dielectric layer 007 had a thickness of 50 nm, and both of the high Rc and high Rc/Ra were achieved. Sample 4-4 was evaluated as x for the amount of archival overwrite deterioration, for which Sample 1-3 containing no Sb was evaluated as ○. Accordingly, Sample 4-4 was evaluated as x in the comprehensive evaluation.

In Sample 4-5, the second dielectric layer 007 had a thickness of 47 nm, and both of the high Rc and high Rc/Ra were achieved. Sample 4-5 was evaluated as Δ for the amount of archival overwrite deterioration, for which Sample 1-4 containing no Sb was evaluated as ○. However, Sample 4-5 was not evaluated as x for any other item, either. Accordingly, Sample 4-5 was evaluated as Δ in the comprehensive evaluation.

In Sample 4-6, the second dielectric layer 007 had a thickness of 47 nm, and both of the high Rc and high Rc/Ra were achieved. Sample 4-6 was evaluated as x for the amount of archival overwrite deterioration, for which Sample 1-4 containing no Sb was evaluated as ○. Accordingly, Sample 4-6 was evaluated as x in the comprehensive evaluation.

Additionally, optical information recording media (Sample 4-7, Sample 4-8, and Sample 4-9), each including three information layers, were produced in the same manner as Sample 4-2, Sample 4-4, and Sample 4-6, respectively, except for that the respective recording layers 005 had a thickness of 15 nm in order to reduce the amount of archival overwrite deterioration of Sample 4-2, Sample 4-4, and Sample 4-6.

In each of these samples, the second dielectric layer 007 had a thickness that allowed both of the high Rc and high Rc/Ra to be achieved. Table 10 shows the evaluation results of the samples.

TABLE 10

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 4-7 | 15 | 15 | 47 | 1.5 | 5.6 | Δ | Δ | X | Δ | Δ | X | X |
| 4-8 | 15 | 15 | 50 | 2.1 | 6.5 | ○ | ○ | X | ○ | ○ | X | X |
| 4-9 | 15 | 15 | 47 | 2.5 | 7.1 | ◎ | ◎ | Δ | ○ | ○ | X | X |

All of Samples 4-7, 4-8 and 4-9 were evaluated as x for the amount of archival overwrite deterioration. Accordingly, they were evaluated as x in the comprehensive evaluation.

The above-mentioned results of Example 4 can be summarized as follows. The samples were evaluated as Δ in the comprehensive evaluation when they included the recording layer 005 formed of the material obtained by adding Sb into the composition in which the molar ratio of GeTe to $Sb_2Te_3$ (GeTe/$Sb_2Te_3$) was 18, 22, or 31, that is, when they included the recording layer 005 represented by $Ge_xSb_yTe_z$ in atomic number ratio, where x, y, and z satisfy $0.39 \leq x < 0.48$, $0.02 \leq y < 0.11$, $0.40 \leq z < 0.56$, and $x+y+z=1$. Samples 4-2, 4-4, and 4-6, in all of which $y \geq 0.11$, were evaluated as x for the amount of archival overwrite deterioration.

Example 5

Optical information recording media, each including three information layers, were produced in the same manner as Sample 1-3 of Example 1, except for that the respective first dielectric layers 003 had thicknesses other than 15 nm in order to study how the medium properties depended on the thicknesses of the first dielectric layers 003. These media were referred to as Samples 5-1, 5-2, 5-3, and 5-4, in which the first dielectric layers had thicknesses of 22 nm, 20 nm, 10 nm, and 8 nm, respectively.

Table 11 shows the evaluation results of these samples. In each of the samples, the second dielectric layer 007 had a thickness of 55 nm.

In Sample 5-5, the Rc was lower but the Rc/Ra was higher than in Sample 5-4. However, Sample 5-5 was evaluated as x for the 9T Amp and 9T C/N. Accordingly, Sample 5-5 was evaluated as x in the comprehensive evaluation. The above-mentioned results of Example 5 can be summarized as follows. Samples 5-2, 1-3, and 5-3, in each of which the first dielectric layer 003 had a thickness of at least 10 nm but not more than 20 nm, were evaluated as ○ or Δ in the comprehensive evaluation.

TABLE 11

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 5-1 | 12 | 22 | 55 | 0.9 | 5.8 | X | X | ○ | X | Δ | ○ | X |
| 5-2 | 12 | 20 | 55 | 1.5 | 7.8 | Δ | Δ | ○ | ○ | ○ | ○ | Δ |
| 1-3 | 12 | 15 | 55 | 2 | 8.2 | ○ | ○ | ○ | ○ | ○ | ○ | ○ |
| 5-3 | 12 | 10 | 55 | 2.8 | 6 | Δ | Δ | ○ | Δ | ○ | ○ | Δ |
| 5-4 | 12 | 8 | 55 | 3.2 | 4.2 | X | X | ○ | Δ | ○ | Δ | X |

In Sample 5-1, it was difficult to have Rc of 1% or more. The Rc/Ra was 5.8. Sample 5-1 was evaluated as x for the 9T Amp, 9T C/N, and 9T modulation degree. Accordingly, Sample 5-1 was evaluated as x in the comprehensive evaluation. In Sample 5-2, both of the Rc and Rc/Ra were higher than those of Sample 5-1. Sample 5-2 was evaluated as Δ for the 9T Amp and 9T C/N, for which Sample 5-1 was evaluated as x. Sample 5-2 was evaluated as ○ for the 9T modulation degree, for which Sample 5-1 was evaluated as x. Sample 5-2 was not evaluated as x for any other item, either. Accordingly, Sample 5-2 was evaluated as Δ in the comprehensive evaluation.

In Sample 5-3, the Rc was higher than that of Sample 1-3, but the Rc/Ra was lowered slightly to 6.0. However, Sample 5-3 was evaluated as Δ for the 9T Amp, 9T C/N, and 9T modulation degree, and was not evaluated as x for any other item, either. Accordingly, Sample 5-3 was evaluated as Δ in the comprehensive evaluation.

In Sample 5-4, the Rc was higher than that of Sample 5-3, but the Rc/Ra was lowered to 4.2. Sample 5-4 was evaluated as x for the 9T Amp and 9T C/N. Accordingly, Sample 5-4 was evaluated as x in the comprehensive evaluation.

Additionally, an optical information recording medium (Sample 5-5) including three information layers were produced in the same manner as Sample 5-4, except for that the second dielectric layer 007 of Sample 5-4 had a thickness of 50 nm in order to enhance the 9T Amp and 9T C/N of Sample 5-4. Table 12 shows the evaluation results thereof.

In the present example, $TiO_2$ (having a refractive index of 2.50 and an extinction coefficient of 0.03 with respect to a laser beam at a wavelength of 405 nm) was used for the first dielectric layers 003. However, a material having a refractive index equivalent to or higher than that of the $TiO_2$ may be used, such as an oxide material containing Bi and Ti, and an oxide material containing Nb and Ti.

When the material used for the first dielectric layer 003 has a higher refractive index, the Rc/Ra can be higher.

When an oxide material containing Bi and Ti is used for the first dielectric layer 003, it preferably is a material obtained by, for example, mixing $Bi_2O_3$ and $TiO_2$ at a molar concentration ratio of 2:3, from the viewpoint of mass productivity, reliability of disc, and disc properties. When the mixing ratio of $Bi_2O_3$ is higher, the sputtering rate as well as the optical constant of the thin film can be increased.

The above-mentioned thin film material of $(Bi_2O_3)_{40}(TiO_2)_{60}$ (mol %) has a refractive index of 2.75 and an extinction coefficient of 0.02.

The refractive index of the above-mentioned material is higher than the refractive index (2.50) of $TiO_2$. When this material is used for the first dielectric layer 003, the optimal thickness for the first dielectric layer 003 is at least 9 nm but not more than 18 nm.

When an oxide material containing Nb and Ti is used for the first dielectric layer 003, it preferably is a material obtained by, for example, mixing $Nb_2O_5$ and $TiO_2$ at a molar concentration ratio of 1:1, from the viewpoint of mass productivity, reliability of disc, and disc properties. When the mixing ratio of $Nb_2O_5$ is higher, the sputtering rate as well as the optical constant of the thin film can be increased.

TABLE 12

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 5-5 | 12 | 8 | 50 | 2.6 | 5 | X | X | ○ | Δ | ○ | Δ | X |

The above-mentioned thin film material of $(Nb_2O_5)_{50}(TiO_2)_{50}$ (mol %) has a refractive index of 2.55 and an extinction coefficient of 0.07.

Moreover, when the mixing ratio of $TiO_2$ is higher, the corrosion resistance of the medium can be increased when the material is used for the first dielectric layer 003 of the medium.

The refractive index of the above-mentioned material is almost equal to the refractive index (2.5) of $TiO_2$. When this material is used for the first dielectric layer 003, the optimal thickness for the first dielectric layer 003 is at least 10 nm but not more than 20 nm.

TABLE 13

| Sample | Target ratios of elements (atom %) | | | Analysis results (atom %) | | |
|---|---|---|---|---|---|---|
| | Ge | Sb | Te | Ge | Sb | Te |
| 6-1 | 2.0 | 75.0 | 23.0 | 1.9 | 74.8 | 23.3 |
| 6-2 | 5.0 | 75.0 | 20.0 | 5.0 | 75.3 | 19.7 |
| 6-3 | 10.0 | 75.0 | 15.0 | 10.1 | 75.1 | 14.8 |
| 6-4 | 15.0 | 75.0 | 10.0 | 14.9 | 75.1 | 10.0 |
| 6-5 | 20.0 | 75.0 | 5.0 | 20.1 | 74.9 | 5.0 |

Table 14 shows the evaluation results of the samples.

TABLE 14

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 6-1 | 9.5 | 15 | 50 | 0.8 | 4.7 | X | X | ◎ | ◎ | Δ | ○ | X |
| 6-2 | 9.5 | 15 | 48 | 1.4 | 4.4 | Δ | Δ | ○ | ◎ | Δ | ○ | Δ |
| 6-3 | 9.5 | 15 | 45 | 2 | 4.3 | ○ | ○ | ○ | ○ | ○ | ○ | ○ |
| 6-4 | 9.5 | 15 | 42 | 2.3 | 4.1 | ○ | ○ | ○ | Δ | ○ | ○ | Δ |
| 6-5 | 9.5 | 15 | 41 | 2.8 | 3.9 | ◎ | ◎ | ○ | X | ○ | ◎ | X |

More specifically, it is preferable that the first dielectric layer 003 has a refractive index of at least 2.5 but not more than 2.8, and a thickness of at least 9 nm but not more than 20 nm.

The following examples are examples in which eutectic recording materials composed of Ge—Sb—Te (Embodiment 2 in the embodiments) were used.

Example 6

Example 6 is an example in which studies were made to see how the amount of Ge affected the medium properties when the respective Ge—Sb—Te eutectic recording materials were used for the recording layer 005 of the optical information recording medium 100 shown in FIG. 1.

Here, $(ZrO_2)_{25}(SiO_2)_{25}(Cr_2O_3)_{50}$ (mol %) was used for the first dielectric layers 003 and the first interface layers 004 in media in which the Ge—Sb—Te eutectic recording material was used for the recording layers 005. Hereinafter, the first dielectric layers 003 had a thickness of 15 nm and the first interface layers 004 had a thickness of 2 nm, unless otherwise noted.

Optical information recording media referred to as Samples 6-1 to 6-5, each including three information layers, were produced in the same manner as Example 1, except for that, as described above, the Ge—Sb—Te eutectic recording materials were used for the recording layers 005, and $(ZrO_2)_{25}(SiO_2)_{25}(Cr_2O_3)_{50}$ (mol %) was used for the first dielectric layers 003. The compositions of the eutectic recording materials were as shown in Table 13. Samples 6-1 to 6-5 were produced using these compositions different from each other.

Table 13 shows the target ratios of elements for the recording layers 005 tested in the present example. Table 13 also shows the results of composition analyses that were made on samples prepared separately for elemental analyses, each formed of only the respective recording layer, using the ICP emission spectrochemical analysis method.

In Sample 6-1, the Rc was highest when the second dielectric layer 007 had a thickness of 50 nm, but the value thereof was as low as 0.8%. As a result, Sample 6-1 was evaluated as x for the 9T Amp and 9T C/N, and evaluated as x in the comprehensive evaluation.

In Sample 6-2, the second dielectric layer 007 had a thickness of 48 nm, and both of the high Rc and high Rc/Ra were achieved. In Sample 6-2, the Rc was increased to 1.4%, which was higher than that of Sample 6-1. The 9T Amp and 9T C/N were enhanced and Sample 6-2 was evaluated as Δ for these items. Sample 6-2 was not evaluated as x in any other item, either. Accordingly, Sample 6-2 was evaluated as Δ in the comprehensive evaluation.

In Sample 6-3, the second dielectric layer 007 had a thickness of 45 nm, and both of the high Rc and high Rc/Ra were achieved. Sample 6-3 was evaluated as ○ for all the items and evaluated as ○ in the comprehensive evaluation.

In Sample 6-4, the thickness of the second dielectric layer 007 was 42 nm, and both of the high Rc and high Rc/Ra were achieved. Sample 6-4 was evaluated as Δ for the 9T modulation degree because it contained a less amount of Te than that of Sample 6-3. Sample 6-4 was not evaluated as x in any other item, either. Accordingly, Sample 6-4 was evaluated as Δ in the comprehensive evaluation.

In Sample 6-5, the second dielectric layer 007 had a thickness of 41 nm, and both of the high Rc and high Rc/Ra were achieved. Sample 6-5 was evaluated as x for the 9T modulation degree because the amount of Ge contained in the composition exceeded the upper limit of 15 atom %. Accordingly, Sample 6-5 was evaluated as x in the comprehensive evaluation.

Additionally, an optical information recording medium (Sample 6-6) including three information layers was produced in the same manner as Sample 6-5, except for that, in order to enhance the 9T modulation degree of Sample 6-5, the amount of Ge contained in the recording layer 005 was the same as that of Sample 6-5, and the amount of Te was increased while reducing that amount of Sb. Table 15 shows the target ratios of elements for the recording layer 005. Table 15 also shows the results of composition analysis that was made on a sample formed of only the recording layer and prepared separately for elemental analysis, using the ICP emission spectrochemical analysis method.

TABLE 15

| | Target ratios of elements (atom %) | | | Analysis results (atom %) | | |
|---|---|---|---|---|---|---|
| Sample | Ge | Sb | Te | Ge | Sb | Te |
| 6-6 | 20.0 | 70.0 | 10.0 | 20.1 | 70.2 | 9.7 |

Table 16 shows the evaluation results of Sample 6-6

TABLE 16

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 6-6 | 9.5 | 15 | 41 | 2.7 | 4.2 | ◎ | ◎ | Δ | Δ | ◎ | X | X |
| 6-7 | 12 | 15 | 41 | 2.8 | 4 | ○ | ○ | Δ | Δ | Δ | X | X |

In Sample 6-6, the 9T modulation degree was better than that of Sample 6-5, and Sample 6-6 was evaluated as Δ for this item. However, Sample 6-6 was evaluated as x for the amount of archival overwrite deterioration because the amount of Ge contained therein exceeded the upper limit of 15 atom %. Accordingly, Sample 6-6 was evaluated as x in the comprehensive evaluation.

Additionally, an optical information recording medium (Sample 6-7) including three information layers was produced in the same manner as Sample 6-6, except for that, although the same recording layer 005 as that of Sample 6-6 was used, the recording layer 005 had a thickness of 12 nm in order to reduce the amount of archival overwrite deterioration of Sample 6-6.

Table 16 shows the evaluation results thereof.

Like Sample 6-6, Sample 6-7 was still evaluated as x for the amount of archival overwrite deterioration. Moreover, Sample 6-7 was evaluated as ○ for the 9T Amp and 9T C/N, for which Sample 6-6 were evaluated as ◎. Sample 6-7 was evaluated as Δ for the amount of archival deterioration. Accordingly, Sample 6-7 was evaluated as x in the comprehensive evaluation.

The above-mentioned results of Example 6 can be summarized as follows.

Satisfactory disc properties can be achieved when the composition of the recording layer 005 is represented by $Ge_xSb_yTe_z$ in atomic number ratio, and the value of x indicating the amount of Ge satisfies $0.05 \leq x \leq 0.15$, where $x+y+z=1$.

Example 7

Example 7 is an example in which studies were made to see how the amount of Sb affected the disc properties when the respective Ge—Sb—Te eutectic recording materials were used for the recording layer 005 of the optical information recording medium 100.

Optical information recording media (Samples 7-1 to 7-4), each including three information layers, were produced in the same manner as Example 6, except for that the amount of Ge contained in the respective recording layers 005 was approximately 10 atom %, and the amount of Sb was other than 75 atom %.

Table 17 shows the target ratios of elements for the recording layers 005 tested in the present example. Table 17 also shows the results of composition analyses that were made on samples prepared separately for elemental analyses, each formed of only the respective recording layer, using the ICP emission spectrochemical analysis method.

TABLE 17

| | Target ratios of elements (atom %) | | | Analysis results (atom %) | | |
|---|---|---|---|---|---|---|
| Sample | Ge | Sb | Te | Ge | Sb | Te |
| 7-1 | 10.0 | 66.0 | 24.0 | 10.1 | 66.0 | 23.9 |
| 7-2 | 10.0 | 70.0 | 20.0 | 10.1 | 70.1 | 19.8 |
| 7-3 | 10.0 | 80.0 | 10.0 | 9.9 | 80.0 | 10.1 |
| 7-4 | 10.0 | 84.0 | 6.0 | 10.0 | 84.2 | 5.8 |

Table 18 shows the evaluation results of these samples.

TABLE 18

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 7-1 | 9.5 | 15 | 46 | 2 | 4.9 | ○ | ○ | X | ◎ | ◎ | X | X |
| 7-2 | 9.5 | 15 | 45 | 2 | 4.6 | ○ | ○ | Δ | ◎ | ◎ | Δ | Δ |
| 6-3 | 9.5 | 15 | 45 | 2 | 4.3 | ○ | ○ | ○ | ○ | ○ | ○ | ○ |
| 7-3 | 9.5 | 15 | 45 | 2 | 4.4 | ○ | ○ | ◎ | Δ | Δ | ◎ | Δ |
| 7-4 | 9.5 | 15 | 44 | 2 | 4 | ○ | ○ | ◎ | Δ | X | ◎ | X |

In Sample 7-1, the second dielectric layer 007 had a thickness of 46 nm, and both of the high Rc and high Rc/Ra were achieved. Sample 7-1 was evaluated as x for the 9T/2T erasure rate and amount of archival overwrite deterioration. Accordingly, Sample 7-1 was evaluated as x in the comprehensive evaluation.

In Sample 7-2, the second dielectric layer 007 had a thickness of 45 nm, and both of the high Rc and high Rc/Ra were achieved. Sample 7-2 was evaluated as Δ for the 9T erasure rate and amount of archival overwrite deterioration. Sample 7-2 was not evaluated as x for any other item, either. Accordingly, Sample 7-2 was evaluated as Δ in the comprehensive evaluation.

In Sample 7-3, the second dielectric layer 007 had a thickness of 45 nm, and both of the high Rc and high Rc/Ra were achieved. The 9T erasure rate and amount of archival overwrite deterioration were enhanced to ⊚. However, Sample 7-3 was evaluated as Δ for the 9T modulation degree and amount of archival deterioration. Sample 7-3 was not evaluated as x for any other item, either. Accordingly, Sample 7-3 was evaluated as Δ in the comprehensive evaluation.

In Sample 7-4, the second dielectric layer 007 has a thickness of 44 nm, and both of the high Rc and high Rc/Ra were achieved. Sample 7-4 was evaluated as x for the amount of archival deterioration. Accordingly, Sample 7-4 was evaluated as x in the comprehensive evaluation.

Additionally, an optical information recording medium (Sample 7-5) including three information layers was produced in the same manner as Sample 7-1, except for that the recording layer 005 had a thickness of 10 nm in order to enhance the 9T/2T erasure rate and reduce amount of archival overwrite deterioration of Sample 7-1.

Furthermore, an optical information recording medium (Sample 7-6) including three information layers was produced in the same manner as Sample 7-4, except for that the recording layer 005 had a thickness of 9 nm in order to reduce the amount of archival deterioration of Sample 7-4.

Table 19 shows the evaluation results of these samples.

In Sample 7-5, the 9T/2T erasure rate was better than that of Sample 7-1, and Sample 7-5 was evaluated as Δ for the 9T/2T erasure rate, for which Sample 7-1 was evaluated as x. However, Sample 7-5 was evaluated as x for the archival overwrite deterioration. Accordingly, Sample 7-5 was evaluated as x in the comprehensive evaluation.

Sample 7-6 had no better evaluation results than those of Sample 7-4. Accordingly, Sample 7-6 was evaluated as x in the comprehensive evaluation.

The above-mentioned results of Example 7 can be summarized as follows. Satisfactory medium properties can be achieved when the composition of the recording layer 005 is represented by $Ge_xSb_yTe_z$ in atomic number ratio, and the value of y indicating the amount of Sb satisfies $0.70 < y \leq 0.80$, where $x+y+z=1$.

Example 8

In the present example, studies were made to see how the thickness of the recording layer 005 affected the medium properties. Optical information recording media, each including three information layers, were produced in the same manner as Sample 6-3, except for that the respective recording layers 005 had a thickness other than 9.5 nm. More specifically, the recording layers 005 had a composition represented by $Ge_{10.1}Sb_{75.1}Te_{14.8}$ according to the ICP analysis.

These optical information recording media were referred to as Sample 8-1, Sample 8-2, Sample 8-3, and Sample 8-4, in which the recording layers 005 had thicknesses of 5 nm, 7 nm, 12 nm, and 14 nm, respectively.

Table 20 shows the evaluation results of these samples.

TABLE 19

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 7-5 | 10 | 15 | 46 | 1.8 | 5 | ○ | ○ | Δ | ⊚ | ○ | X | X |
| 7-6 | 9 | 15 | 44 | 1.7 | 4.3 | ○ | ○ | ⊚ | Δ | X | ⊚ | X |

TABLE 20

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 8-1 | 5 | 15 | 55 | 0.9 | 4 | X | X | ◎ | ○ | ◎ | X | X |
| 8-2 | 7 | 15 | 54 | 1.2 | 4.1 | Δ | Δ | ◎ | ○ | ◎ | Δ | Δ |
| 6-3 | 9.5 | 15 | 45 | 2 | 4.3 | ○ | ○ | ○ | ○ | ○ | ○ | ○ |
| 8-3 | 12 | 15 | 37 | 2.2 | 4.1 | ○ | ○ | ○ | ○ | Δ | ◎ | Δ |
| 8-4 | 14 | 15 | 35 | 2 | 3.2 | X | X | ◎ | ○ | X | ◎ | X |

In Sample 8-1, the Rc was able to be highest when the second dielectric layer 007 had a thickness of 55 nm. However, the Rc was as low as 0.9%. As shown in the evaluation results, Sample 8-1 was evaluated as x for the 9T Amp, 9T C/N, and archival overwrite deterioration. Accordingly, Sample 8-1 was evaluated as x in the comprehensive evaluation.

In Sample 8-2, the second dielectric layer 007 had a thickness of 54 nm, and both of the high Rc and high Rc/Ra were achieved. It was possible to ensure 1% or more of Rc and increase the Rc/Ra to 4.1. Sample 8-2 was evaluated as Δ for the 9T Amp, 9T C/N, and archival overwrite deterioration. Accordingly, Sample 8-2 was evaluated as Δ in the comprehensive evaluation.

In Sample 8-3, the second dielectric layer 007 had a thickness of 37 nm, and both of the high Rc and high Rc/Ra were achieved. Sample 8-3 was evaluated as Δ for the amount of archival deterioration, and was not evaluated as x for any other item, either. Accordingly, Sample 8-3 was evaluated as Δ in the comprehensive evaluation.

In Sample 8-4, the second dielectric layer 007 had a thickness of 35 nm, and both of the high Rc and high Rc/Ra were achieved. However, the Rc/Ra was as low as 3.2, and it was difficult to increase the Rc/Ra even by adjusting the thickness of the second dielectric layer 007. As shown in the evaluation results, Sample 8-4 was evaluated as x for the 9T Amp, 9T C/N, and amount of archival deterioration. Accordingly, Sample 8-4 was evaluated as x in the comprehensive evaluation.

Additional samples were produced by varying the compositions of the recording layers 005 included in Samples 8-1 and 8-4 in order to enhance evaluation items for which Samples 8-1 and 8-4 were evaluated as x. Table 21 shows the evaluation results of these samples.

More specifically, the recording layer 005 of Sample 8-5 had a composition of $Ge_{14.9}Sb_{75.1}Te_{10.0}$ (atom %), which was obtained by increasing the amount of Ge and reducing the amount of Te contained in the composition of $Ge_{10.1}Sb_{75.1}Te_{14.8}$ (atom %) used for the recording layer 005 of Sample 8-1.

In Sample 8-5, the second dielectric layer 007 had a thickness of 52 nm, and both of the high Rc and high Rc/Ra were achieved. In Sample 8-5, the Rc and Rc/Ra were higher than those of Sample 8-1. As a result, the 9T Amp and 9T C/N were enhanced and Sample 8-5 was evaluated as Δ for these items. However, like Sample 8-1, Sample 8-5 was evaluated as x for the amount of archival overwrite deterioration. Accordingly, Sample 8-5 was evaluated as x in the comprehensive evaluation.

As Sample 8-6, an optical information recording medium including three information layers was produced in the same manner as Sample 8-1, except for that the recording layer 005 had the same composition as that used for the recording layer 005 of Sample 7-3 in order to reduce the amount of archival overwrite deterioration of Sample 8-1.

More specifically, the recording layer 005 of Sample 8-6 had a composition of $Ge_{9.9}Sb_{80.0}Te_{10.1}$ (atom %), which was obtained by increasing the amount of Sb and reducing the amount of Te contained in the composition of $Ge_{10.1}Sb_{75.1}Te_{14.8}$ (atom %) used for the recording layer 005 of Sample 8-1.

In Sample 8-6, it was difficult to achieve both of the high Rc and high Rc/Ra. Sample 8-6 was evaluated as x for the 9T Amp and 9T C/N. Accordingly, Sample 8-6 was evaluated as x in the comprehensive evaluation.

As Sample 8-7, an optical information recording medium including three information layers was produced in the same manner as Sample 8-4, except for that the recording layer 005

TABLE 21

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 8-5 | 5 | 15 | 52 | 1.3 | 4 | Δ | Δ | Δ | Δ | ◎ | X | X |
| 8-6 | 5 | 15 | 56 | 0.9 | 3.6 | X | X | ○ | Δ | ○ | ○ | X |
| 8-7 | 14 | 15 | 35 | 2 | 3.2 | X | X | Δ | ◎ | Δ | Δ | X |
| 8-8 | 14 | 15 | 42 | 2 | 4 | Δ | Δ | ○ | Δ | X | ◎ | X |

As Sample 8-5, an optical information recording medium including three information layers was produced in the same manner as Sample 8-1, except for that the recording layer 005 had the same composition as that used for the recording layer 005 of Sample 6-4 in order to enhance the 9T Amp and 9T C/N of Sample 8-1.

had the same composition as that used for the recording layer 005 of Sample 7-2 in order to reduce the amount of archival deterioration of Sample 8-4.

More specifically, the recording layer 005 of Sample 8-7 had a composition of $Ge_{10.1}Sb_{70.1}Te_{19.8}$ (atom %), which was obtained by reducing the amount of Sb and increasing the amount of Te contained in the composition of $Ge_{10.1}Sb_{75.1}Te_{14.8}$ (atom %) used for the recording layer 005 of Sample 8-4.

In Sample 8-7, it was difficult to achieve both of the high Rc and high Rc/Ra. Sample 8-7 was evaluated as x for the 9T Amp and 9T C/N. Accordingly, Sample 8-7 was evaluated as x in the comprehensive evaluation.

layers 007 had a thickness other than 45 nm. These optical information recording media were referred to as Sample 9-1, Sample 9-2, Sample 9-3, and Sample 9-4, in which the second dielectric layers 007 had thicknesses of 33 nm, 35 nm, 55 nm, and 57 nm, respectively.

Table 22 shows the evaluation results of these samples.

TABLE 22

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 9-1 | 9.5 | 15 | 33 | 0.8 | 5.1 | X | X | ○ | ○ | ○ | ○ | X |
| 9-2 | 9.5 | 15 | 35 | 12 | 4.9 | Δ | Δ | ○ | ○ | ○ | ○ | Δ |
| 6-3 | 9.5 | 15 | 45 | 2 | 4.3 | ○ | ○ | ○ | ○ | ○ | ○ | ○ |
| 9-3 | 9.5 | 15 | 55 | 2.8 | 4 | Δ | Δ | ○ | Δ | ○ | ○ | Δ |
| 9-4 | 9.5 | 15 | 57 | 3.1 | 3.7 | X | X | ○ | Δ | ○ | ○ | X |

As Sample 8-8, an optical information recording medium including three information layers was produced in the same manner as Sample 8-4, except for that the recording layer 005 had the same composition as that used for the recording layer 005 of Sample 6-4 in order to enhance the 9T Amp and 9T C/N of Sample 8-4.

More specifically, the recording layer 005 of Sample 8-8 had a composition of $Ge_{14.9}Sb_{75.1}Te_{10.0}$ (atom %), which was obtained by increasing the amount of Ge and reducing the amount of Te contained in the composition of $Ge_{10.1}Sb_{75.1}Te_{14.8}$ (atom %) used for the recording layer 005 of Sample 8-4.

In Sample 8-8, the second dielectric layer 007 had a thickness of 42 nm, and both of the high Rc and high Rc/Ra were achieved. The 9T Amp and 9T C/N were enhanced and Sample 8-8 was evaluated as Δ for these items. However, Sample 8-8 was evaluated as x for the amount of archival deterioration. Accordingly, Sample 8-8 was evaluated as x in the comprehensive evaluation.

The above-mentioned results of Example 8 can be summarized as follows. Satisfactory medium properties can be achieved when the thickness of the recording layer 005 is at least 7.0 nm but not more than 12.0 nm. When the thickness of the recording layer 005 was out of this range, the samples failed to be evaluated as ○ or Δ in the comprehensive evaluation of medium properties even when the composition of the recording film 005 was varied.

In Sample 9-1, the Rc was as low as 0.8%. Thus, Sample 9-1 was evaluated as x for the 9T Amp and 9T C/N. Accordingly, Sample 9-1 was evaluated as x in the comprehensive evaluation.

In Sample 9-2, the Rc was increased to 1.2%, which was higher than that of Sample 9-1. The 9T Amp and 9T C/N were enhanced, and Sample 9-2 was evaluated as Δ for these items. Sample 9-2 was not evaluated as x in any other item, either. Accordingly, Sample 9-2 was evaluated as Δ in the comprehensive evaluation.

Sample 9-3 was evaluated as Δ for the 9T Amp and 9T C/N. Sample 9-3 was not evaluated as x for any other item, either. Accordingly, Sample 9-3 was evaluated as Δ in the comprehensive evaluation.

In Sample 9-4, the Rc was high but it was difficult to increase the Rc/Ra. Sample 9-4 was evaluated as x for the 9T Amp and 9T C/N. Accordingly, Sample 9-4 was evaluated as x in the comprehensive evaluation.

As described above, it has been found that the second dielectric layer 007 with a small thickness makes it difficult to increase the Rc to 1% or more, and on the other hand, the second dielectric layer 007 with a large thickness lowers the Rc/Ra.

Additional samples were produced by varying the compositions of the recording layers 005 included in Samples 9-1 and 9-4 in order to enhance evaluation items for which Sample 9-1 and Sample 9-4 were evaluated as x. These samples were referred to as Sample 9-5 and Sample 9-6. Table 23 shows the evaluation results thereof.

TABLE 23

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 9-5 | 9.5 | 15 | 33 | 1.2 | 4.5 | Δ | Δ | Δ | X | ○ | ○ | X |
| 9-6 | 9.5 | 15 | 57 | 2.6 | 4 | Δ | Δ | Δ | X | ○ | ○ | X |

Example 9

In the present example, studies were made to see how the thickness of the second dielectric layer 007 affected the medium properties.

Optical information recording media, each including three information layers, were produced in the same manner as Sample 6-3, except for that the respective second dielectric As Sample 9-5, an optical information recording media including three information layers was produced in the same manner as Sample 9-1, except for that the recording layer 005 had the same composition as that used for the recording layer 005 of Sample 6-4 shown in Table 13 in order to increase the Rc of Sample 9-1.

More specifically, the recording layer 005 of Sample 9-5 had a composition of $Ge_{14.9}Sb_{75.1}Te_{10.0}$ (atom %), which was obtained by increasing the amount of Ge and reducing the amount of Te contained in the composition of $Ge_{10.1}Sb_{75.1}Te_{14.8}$ (atom %) used for the recording layer 005 of Sample 9-1.

As shown in the evaluation results, the Rc of Sample 9-5 was increased to 1.2%, which was higher than that of Sample 9-1. The 9T Amp and 9T C/N were enhanced, and Sample 9-5 was evaluated as Δ for these items. However, Sample 9-5 was evaluated as x for the 9T modulation degree due to the decreased amount of Te. Accordingly, Sample 9-5 was evaluated as x in the comprehensive evaluation.

As Sample 9-6, an optical information recording media including three information layers was produced in the same manner as Sample 9-4, except for that the recording layer 005 had the same composition as that used for the recording layer 005 of Sample 6-4 in order to enhance the 9T Amp and 9T C/N of Sample 9-4.

More specifically, the recording layer 005 of Sample 9-6 had a composition of $Ge_{14.9}Sb_{75.1}Te_{10.0}$ (atom %), which was obtained by increasing the amount of Ge and reducing the amount of Te contained in the composition of $Ge_{10.1}Sb_{75.1}Te_{14.8}$ (atom %) used for the recording layer 005 of Sample 9-4.

As shown in the evaluation results, the 9T Amp and 9T C/N of Sample 9-6 were better than those of Sample 9-4, and Sample 9-6 was evaluated as Δ for these items. However, Sample 9-6 was evaluated as x for the 9T modulation degree due to the decreased amount of Te. Accordingly, Sample 9-6 was evaluated as x in the comprehensive evaluation.

The above-mentioned results of Example 9 can be summarized as follows. It is preferable for the second dielectric layer 007 to have a thickness of at least 35 nm but not more than 55 nm when the first dielectric layer 003 has a thickness of 15 nm and ZnS—SiO₂ is used as the material for the second dielectric layer 007.

In the present example, ZnS-20 mol % $SiO_2$ (having a refractive index of 2.20 and an extinction coefficient of 0.02 with respect to a laser beam at a wavelength of 405 nm) was used for the second dielectric layers 007. However, a material having a refractive index equivalent to that of the above-mentioned material may be used, such as a material (having a refractive index of 2.30 and an extinction coefficient of 0.05 with respect to a laser beam at a wavelength of 405 nm) obtained by mixing 25 mol % of $ZrO_2$, 25 mol % of $SiO_2$, and 50 mol % of $Cr_2O_3$ together.

However, from the viewpoint of mass productivity and reliability, it is desirable to use ZnS-20 mol % $SiO_2$ because of its high sputtering rate and excellent corrosion resistance.

Example 10

Optical information recording media, each including three information layers, were produced in the same manner as Sample 6-3, except for that the respective first dielectric layers 003 had thicknesses other than 15 nm in order to study how the evaluation results of the media depend on the thicknesses of the first dielectric layers 003. These optical information recording media were referred to as Sample 10-1, Sample 10-2, Sample 10-3, and Sample 10-4, in which the first dielectric layers 003 had thicknesses of 22 nm, 20 nm, 10 nm, and 8 nm, respectively.

Table 24 shows the evaluation results of these samples. In each of these samples, the second dielectric layer 007 had a thickness of 45 nm.

TABLE 24

| Sample | Thickness of recording layer nm | Thickness of first dielectric layer nm | Thickness of second dielectric layer nm | Rc % | Rc/Ra | 9T Amp | 9T C/N | 9T/2T erasure rate | 9T modulation degree | Amount of archival deterioration | Amount of archival overwrite deterioration | Comprehensive evaluation |
|---|---|---|---|---|---|---|---|---|---|---|---|---|
| 10-1 | 9.5 | 22 | 45 | 0.8 | 3.6 | X | X | ○ | ○ | Δ | ○ | X |
| 10-2 | 9.5 | 20 | 45 | 1.4 | 4.1 | Δ | Δ | ○ | ○ | ○ | ○ | Δ |
| 6-3 | 9.5 | 15 | 45 | 2 | 4.3 | ○ | ○ | ○ | ○ | ○ | ○ | ○ |
| 10-3 | 9.5 | 10 | 45 | 2.5 | 4 | Δ | Δ | ○ | ○ | ○ | Δ | Δ |
| 10-4 | 9.5 | 8 | 45 | 3 | 3.4 | X | X | ○ | ○ | ○ | Δ | X |

In Sample 10-1, it was difficult to achieve both of the high Rc and high Rc/Ra. Sample 10-1 was evaluated as x for the 9T Amp and 9T C/N. Accordingly, Sample 10-1 was evaluated as x in the comprehensive evaluation.

In Sample 10-2, the Rc and Rc/Ra were higher than those of Sample 10-1. Sample 10-2 was evaluated as Δ for the 9T Amp and 9T C/N. Sample 10-2 was not evaluated as x for any other item, either. Accordingly, Sample 10-2 was evaluated as Δ in the comprehensive evaluation.

In Sample 10-3, the Rc and Rc/Ra were enhanced further. Sample 10-3 was evaluated as Δ for the 9T Amp and 9T C/N. Sample 10-3 was not evaluated as x for any other item, either. Accordingly, Sample 10-3 was evaluated as Δ in the comprehensive evaluation.

In Sample 10-4, it was difficult to increase the Rc/Ra. Sample 10-4 was evaluated as x for the 9T Amp and 9T C/N. Accordingly, Sample 10-4 was evaluated as x in the comprehensive evaluation.

In Example 10, $(ZrO_2)_{25}(SiO_2)_{25}(Cr_2O_3)_{50}$ (mol %) (having a refractive index of 2.30 and an extinction coefficient of 0.05 with respect to a laser beam at a wavelength of 405 nm) was used for the first dielectric layers 003. However, a material having a refractive index equivalent to or lower than that of the above-mentioned $(ZrO_2)_{25}(SiO_2)_{25}(Cr_2O_3)_{50}$ material may be used, such as $(ZrO_2)_{35}(SiO_2)_{35}(Cr_2O_3)_{30}$ (mol %) and $SiO_2$.

In the case where an eutectic recording material is used for the recording layer 005, the Rc/Ra can be higher when the material used for the first dielectric layer 003 has a lower refractive index.

$(ZrO_2)_{35}(SiO_2)_{35}(Cr_2O_3)_{30}$ (mol %) has a refractive index of 2.10 and an extinction coefficient of 0.02 with respect to a laser beam at a wavelength of 405 nm. $SiO_2$ has a refractive index of 1.45 and an extinction coefficient of 0.01 with respect to a laser beam at a wavelength of 405 nm.

For example, it easily can be estimated that the optimal thickness for the first dielectric layer 003 is at least 16 nm but not more than 32 nm when $SiO_2$ is used as the material for the first dielectric layer 003 because the refractive index of $SiO_2$ is lower than the refractive index (2.3) of $(ZrO_2)_{25}(SiO_2)_{25}(Cr_2O_3)_{50}$ (mol %) used in the present example. However, in order to shorten the sputtering time and ensure the mass productivity, the upper limit for the thickness of the first dielectric layer 003 preferably is 20 nm or less.

It is preferable when the material for the first dielectric layer 003 contains $Cr_2O_3$ because it allows a disc to have excellent corrosion resistance. More preferably, $(ZrO_2)_{25}(SiO_2)_{25}(Cr_2O_3)_{50}$ (mol %) is used as the material for the first dielectric layer 003.

Industrial Applicability

The optical information recording medium of the present invention has excellent recording and reproducing properties, archival characteristics, and rewriting performance. Also, the optical information recording medium of the present invention is used suitably as a high-capacity optical information recording medium such as a Blu-ray disc.

The invention claimed is:

1. An optical information recording medium comprising an information layer that allows information to be recorded thereon and reproduced therefrom by irradiation with a laser beam, wherein:
    the information layer includes at least a reflective layer, a first dielectric layer, a recording layer capable of undergoing a phase change by the irradiation with the laser beam and a second dielectric layer formed in this order from a side opposite to a laser beam incident side;
    the recording layer contains Ge, Sb and Te, and when Ge, Sb and Te contained in the recording layer are represented by $Ge_xSb_yTe_z$ in atomic number ratio, x, y, and z satisfy $0.39 \leq x < 0.48$, $0.02 \leq y < 0.11$, $0.41 < z < 0.56$, and $x+y+z=1$;
    the recording layer has a thickness of at least 10 nm but not more than 15 nm; and
    in the case where a ratio of an amount of reflected light of the laser beam from the information layer to an amount of the laser beam incident on the information layer is denoted as R (%), the R when the recording layer is in a crystalline state is denoted as Rc (%), and the R when the recording layer is in an amorphous state is denoted as Ra (%), Rc and Ra satisfy $6.0 \leq Rc/Ra \leq 12.0$ and $1.0 \leq Rc \leq 3.0$.

2. The optical information recording medium according to claim 1, comprising a first information layer to an N-th information layer, where N is an integer of 3 or more, formed sequentially from the side opposite to the laser beam incident side,
    wherein the first information layer is the information layer of claim 1.

3. The optical information recording medium according to claim 1, wherein the first dielectric layer has a refractive index of at least 2.5 but not more than 2.8 and a thickness of at least 9 nm but not more than 20 nm.

4. The optical information recording medium according to claim 1, wherein the first dielectric layer is formed of an oxide material containing Ti, an oxide material containing Bi and Ti, or an oxide material containing Nb and Ti.

5. The optical information recording medium according to claim 1, wherein the second dielectric layer has a refractive index of at least 1.8 but not more than 2.4 and a thickness of at least 45 nm but not more than 65 nm.

6. The optical information recording medium according to claim 1, wherein the second dielectric layer contains a sulfide of Zn and an oxide of Si.

7. The optical information recording medium according to claim 1, wherein:
    the information layer further includes a first interface layer disposed between the first dielectric layer and the recording layer; and
    the first interface layer has a refractive index of at least 1.8 but less than 2.5 and a thickness of at least 2 nm but not more than 10 nm.

8. The optical information recording medium according to claim 7, wherein the first interface layer is formed of an oxide material containing Zr and Cr.

9. The optical information recording medium according to claim 1, wherein:
    the information layer further includes a second interface layer disposed between the recording layer and the second dielectric layer; and
    the second interface layer has a refractive index of at least 1.8 but less than 2.5 and a thickness of at least 2 nm but not more than 10 nm.

10. The optical information recording medium according to claim 9, wherein the second interface layer is formed of an oxide material containing Zr and Cr.

11. The optical information recording medium according to claim 1, wherein;
    the reflective layer is formed of a material containing Ag as a main component; and
    the reflective layer has a thickness of at least 60 nm but not more than 200 nm.

12. The optical information recording medium according to claim 1, wherein the reflective layer contains 95 wt % or more of Ag and further contains at least one element selected from In, Pd, Cu, Bi, Ga, and Nd.

13. The optical information recording medium according to claim 1, wherein the recording layer consists essentially of Ge, Sb and Te.

14. An optical information recording medium comprising an information layer that allows information to be recorded thereon and reproduced therefrom by irradiation with a laser beam, wherein:
    the information layer includes at least a reflective layer, a first dielectric layer, a recording layer capable of undergoing a phase change by the irradiation with the laser beam and a second dielectric layer formed in this order from a side opposite to a laser beam incident side;
    the recording layer contains Ge, Sb and Te, and when Ge, Sb and Te contained in the recording layer are represented by $Ge_xSb_yTe_z$ in atomic number ratio, x, y, and z satisfy $0.05 \leq x \leq 0.15$, $0.70 \leq y \leq 0.80$, $0.05 \leq z \leq 0.25$, and $x+y+z=1$;
    the recording layer has a thickness of at least 7.0 nm but not more than 12.0 nm;
    the second dielectric layer has a refractive index of at least 1.8 but not more than 2.4 and a thickness of at least 35 nm but not more than 55 nm; and
    in the case where a ratio of an amount of reflected light of the laser beam from the information layer to an amount of the laser beam incident on the information layer is denoted as R (%), the R when the recording layer is in a crystalline state is denoted as Rc (%), and the R when the recording layer is in an amorphous state is denoted as Ra (%), Rc and Ra satisfy $4.0 \leq Rc/Ra \leq 5.0$ and $1.0 \leq Rc \leq 3.0$.

15. The optical information recording medium according to claim 14, comprising a first information layer to an N-th information layer, where N is an integer of 3 or more, formed sequentially from the side opposite to the laser beam incident side,
   wherein the first information layer is the information layer of claim 14.

16. The optical information recording medium according to claim 14, wherein the first dielectric layer has a refractive index of at least 1.4 but less than 2.3 and a thickness of at least 10 nm but not more than 20 nm.

17. The optical information recording medium according to claim 14, wherein the first dielectric layer is formed of an oxide material containing Zr and Cr.

18. The optical information recording medium according to claim 14, wherein:
   the information layer further includes an interface layer disposed between the recording layer and the second dielectric layer; and
   the interface layer has a refractive index of at least 1.8 but less than 2.5 and a thickness of at least 2 nm but not more than 10 nm.

19. The optical information recording medium according to claim 18, wherein the first interface layer is formed of an oxide material containing Zr and Cr.

20. The optical information recording medium according to claim 14, wherein the second dielectric layer contains a sulfide of Zn and an oxide of Si.

21. The optical information recording medium according to claim 14, wherein;
   the reflective layer is formed of a material containing Ag as a main component; and
   the reflective layer has a thickness of at least 60 nm but not more than 200 nm.

22. The optical information recording medium according to claim 14, wherein the reflective layer contains 95 wt % or more of Ag and further contains at least one element selected from In, Pd, Cu, Bi, Ga, and Nd.

23. The optical information recording medium according to claim 14, wherein the recording layer consists essentially of Ge, Sb and Te.

* * * * *